(12) United States Patent
Grigorenko et al.

(10) Patent No.: US 11,945,254 B2
(45) Date of Patent: Apr. 2, 2024

(54) SECURITY ELEMENT

(71) Applicant: BASF SE, Ludwigshafen am Rhein (DE)

(72) Inventors: Nikolay A. Grigorenko, Basel (CH); Michelle Richert, Basel (CH)

(73) Assignee: BASF SE, Ludwigshafen am Rhein (DE)

( * ) Notice: Subject to any disclaimer, the term of this patent is extended or adjusted under 35 U.S.C. 154(b) by 140 days.

(21) Appl. No.: 17/424,095

(22) PCT Filed: Jan. 16, 2020

(86) PCT No.: PCT/EP2020/051001
§ 371 (c)(1),
(2) Date: Jul. 19, 2021

(87) PCT Pub. No.: WO2020/152021
PCT Pub. Date: Jul. 30, 2020

(65) Prior Publication Data
US 2022/0097437 A1    Mar. 31, 2022

(30) Foreign Application Priority Data
Jan. 21, 2019 (EP) .................................. 19152705

(51) Int. Cl.
| | |
|---|---|
| B42D 25/373 | (2014.01) |
| B42D 25/21 | (2014.01) |
| B42D 25/351 | (2014.01) |
| B42D 25/415 | (2014.01) |
| C08J 7/04 | (2020.01) |
| C08K 3/08 | (2006.01) |

(52) U.S. Cl.
CPC ........... *B42D 25/351* (2014.10); *B42D 25/21* (2014.10); *B42D 25/373* (2014.10); *B42D 25/415* (2014.10); *C08J 7/0427* (2020.01); *C08K 3/08* (2013.01); *C08J 2367/02* (2013.01); *C08J 2429/04* (2013.01); *C08K 2003/0806* (2013.01); *C08K 2201/003* (2013.01)

(58) Field of Classification Search
CPC .................................................. B42D 25/373
See application file for complete search history.

(56) References Cited

U.S. PATENT DOCUMENTS

| | | | |
|---|---|---|---|
| 3,862,333 A | 1/1975 | Chalupa et al. | |
| 4,151,175 A | 4/1979 | Crivello et al. | |
| 4,399,071 A | 8/1983 | Crivello et al. | |
| 4,694,029 A | 9/1987 | Land | |
| 4,950,581 A | 8/1990 | Koike et al. | |
| 6,306,555 B1 | 10/2001 | Schulz et al. | |
| 2007/0190298 A1* | 8/2007 | Hampden-Smith | B42D 25/373 428/204 |
| 2010/0307705 A1* | 12/2010 | Rahm | B42D 25/373 428/156 |
| 2011/0319535 A1 | 12/2011 | Nesvadba et al. | |
| 2012/0156451 A1* | 6/2012 | Ohashi | C09D 11/38 106/31.62 |
| 2012/0301639 A1* | 11/2012 | Grigorenko | C09D 5/29 428/323 |
| 2014/0319819 A1* | 10/2014 | Power | B42D 25/324 427/7 |
| 2018/0086921 A1* | 3/2018 | Grigorenko | B42D 25/355 |

FOREIGN PATENT DOCUMENTS

| | | |
|---|---|---|
| EP | 0092269 A1 | 10/1983 |
| EP | 0562897 A1 | 9/1993 |
| EP | 0624826 A1 | 11/1994 |
| EP | 2886356 B1 | 3/2017 |
| WO | 90/01512 A1 | 2/1990 |

(Continued)

OTHER PUBLICATIONS

Refractive indices of organic polymers https://scipoly.com/technical-library/refractive-index-of-polymers-by-index/ (Year: 2023).*

(Continued)

*Primary Examiner* — Kyle R Grabowski

(74) *Attorney, Agent, or Firm* — Faegre Drinker Biddle & Reath LLP

(57) ABSTRACT

The present invention relates to security, or decorative elements, comprising a transparent, or translucent substrate, which may contain indicia or other visible features in or on its surface, and on at least part of the substrate surface, a first layer, comprising transition metal particles having an average diameter of from 5 nm to 500 nm and a binder, on at least part of the first layer a second layer, comprising an organic material and having a refractive index of from 1.2 to 2.3 and having a thickness of from 20 to 1000 nm, wherein the transition metal is silver, copper, gold and palladium, wherein the weight ratio of transition metal particles to binder in the first layer is in the range from 20:1 to 1:2 in case the binder is a polymeric binder, or wherein the weight ratio of transition metal particles to binder in the first layer is in the range from 5:1 to 1:15 in case the binder is an UV curable binder. The security or decorative element show a certain color in transmission and a different color in reflection and a color flop on the coating side. The color in reflection and the color flop of the security or decorative elements are controlled by adjusting the refractive index and thickness of the second layer.

18 Claims, No Drawings

(56) References Cited

FOREIGN PATENT DOCUMENTS

| WO | 98/46647 | A1 | | 10/1998 | | |
|---|---|---|---|---|---|---|
| WO | 2005/049745 | A1 | | 6/2005 | | |
| WO | 2006/008251 | A2 | | 1/2006 | | |
| WO | 2011/064162 | A2 | | 6/2011 | | |
| WO | 2011/116419 | A1 | | 9/2011 | | |
| WO | 2013/186167 | A2 | | 12/2013 | | |
| WO | 2014/041121 | A1 | | 3/2014 | | |
| WO | WO-2014041121 | A1 | * | 3/2014 | ........... | B42D 25/328 |
| WO | 2014/118567 | A1 | | 8/2014 | | |
| WO | 2014/187750 | A1 | | 11/2014 | | |
| WO | 2015/120975 | A1 | | 8/2015 | | |
| WO | 2016/091381 | A1 | | 6/2016 | | |
| WO | 2016/173695 | A1 | | 11/2016 | | |
| WO | 2016/173696 | A1 | | 11/2016 | | |
| WO | 2017/008897 | A1 | | 1/2017 | | |
| WO | 2017/008905 | A2 | | 1/2017 | | |
| WO | 2017/028950 | A1 | | 2/2017 | | |
| WO | 2017/054922 | A1 | | 4/2017 | | |
| WO | 2017/080641 | A1 | | 5/2017 | | |
| WO | 2017/092865 | A1 | | 6/2017 | | |
| WO | 2017/114590 | A1 | | 7/2017 | | |
| WO | 2020/083794 | A1 | | 4/2020 | | |

OTHER PUBLICATIONS

What are High Refractive Index Materials? https://avantama.com/what-are-high-refractive-index-materials/ (Year: 2023).*
International Search Report and Written Opinion received for PCT Patent Application No. PCT/EP2020/051001, dated Mar. 18, 2020, 10 pages.

* cited by examiner

SECURITY ELEMENT

CROSS-REFERENCE TO RELATED APPLICATIONS

This application is a national stage application (under 35 U.S.C. § 371) of PCT/EP2020/051001, filed Jan. 16, 2020, which claims benefit of European Application No. 19152705.0, filed Jan. 21, 2019, both of which are incorporated herein by reference in their entirety.

The present invention relates to security, or decorative elements, comprising a transparent, or translucent substrate, which may contain indicia or other visible features in or on its surface, and on at least part of the substrate surface, a first layer, comprising transition metal particles having an average diameter of from 5 nm to 500 nm and a binder, on at least part of the first layer a second layer, comprising an organic material and having a refractive index of from 1.2 to 2.3 and having a thickness of from 20 to 1000 nm, wherein the transition metal is silver, copper, gold and palladium, wherein the weight ratio of transition metal particles to binder in the first layer is in the range from 20:1 to 1:2 in case the binder is a polymeric binder, or wherein the weight ratio of transition metal particles to binder in the first layer is in the range from 5:1 to 1:15 in case the binder is an UV curable binder. The security or decorative element show a certain color in transmission and a different color in reflection and a color flop on the coating side. The color in reflection and the color flop of the security or decorative elements may be controlled by adjusting the refractive index and thickness of the second layer.

WO2011/064162 discloses a security, or decorative element, comprising a substrate, which may contain indicia or other visible features in or on its surface, and on at least part of the said substrate surface, a coating comprising platelet shaped transition metal particles having a longest dimension of edge length of from 15 nm to 1000 nm, preferably from 15 nm to 600 nm and particularly from 20 nm to 500 nm, and a thickness of from 2 nm to 100 nm, preferably from 2 to 40 nm and particularly from 4 to 30 nm.

WO2013/186167 discloses a method for forming a surface relief microstructure, especially an optically variable image (an optically variable device, OVD) on a substrate comprising the steps of:

A) applying a curable composition to at least a portion of the substrate wherein the curable composition comprises a1) at least one ethylenically unsaturated resin, a monomer or a mixture thereof;

a2) at least one photoinitiator; and a3) a metal pigment which is in the form of platelet shaped transition metal particles having a longest dimension of edge length of from 5 nm to 1000 nm, preferably from 7 nm to 600 nm and particularly from 10 nm to 500 nm, and a thickness of from 1 nm to 100 nm, preferably from 2 to 40 nm and particularly from 3 to 30 nm;

B) contacting at least a portion of the curable composition with a surface relief microstructure, especially optically variable image forming means;

C) curing the composition by using at least one UV lamp.

WO2014/041121 relates to a security element, comprising a) a substrate b) a component with refractive index modulation, in particular a volume holo-gram, which is obtainable by exposing a recording material to actinic radiation and thereon c) a coating on at least a portion of the refractive index modulated layer comprising platelet shaped transition metal particles having a longest dimension of edge length of from 15 nm to 1000 nm, preferably from 15 nm to 600 nm and particularly from 20 nm to 500 nm, and a thickness of from 2 nm to 100 nm, preferably from 2 to 40 nm and particularly from 4 to 30 nm.

WO2014/187750 relates to a security element, comprising a) a substrate b) a coating on at least a portion of the substrate comprising at least one liquid crystal compound, the coating being applied on the reverse side of the substrate if the substrate is transparent or translucent or on the surface side if the substrate is transparent, translucent, reflective or opaque and c) a further coating on at least a portion of the coating containing the liquid crystal compound or direct on the substrate if the coating containing the liquid crystal compound is placed on the reverse side of the substrate, the further coating comprising platelet shaped transition metal particles having a longest dimension of edge length of from 5 nm to 1000 nm, preferably from 5 nm to 600 nm and particularly from 10 nm to 500 nm, and a thickness of from 2 nm to 100 nm, preferably from 2 to 40 nm and particularly from 4 to 30 nm.

WO15120975A1 relates to a method for producing a security element (1) with a negative inscription for a security paper or an article of value, in particular a document of value, comprising the following steps: a) providing a transparent carrier substrate (2); b) providing the carrier substrate (2) with an embossed embossing coating (6); c) printing a layer of free-flowing ink (8) containing metal pigments onto the embossing coating (6) in the form of a predetermined pattern with ink layer regions (4) and clearances (5) between the ink layer regions (4) that form the negative inscription, so that on the underside of each individual ink layer region (4), at which the layer of ink (8) and the embossing coating (6) face one another, metal pigments are aligned spatially along the embossing structure (7) of the embossing coating (6) and form a first, lower ink-layer metallization (9); d) bringing the layer of ink (8) into contact with an embossing tool, preferably under increased pressure and at increased temperature, so that the upper side of each individual ink layer region is provided with an embossing structure, along which metal pigments are spatially aligned and form a second, upper ink-layer metallization (10).

WO16091381A1 relates to a security element for protecting documents of value, comprising a carrier and a layered structure arranged on the carrier, comprising a reflective layer, which is arranged on the carrier by means of an embossed coating with an embossed relief structure, a coloured thin-layer element and a transparent adhesive layer, which is suitable for the adhesive bonding of the security element to an object of value, wherein the reflective layer can be obtained by printing techniques and is based on metal pigments in platelet form, which are of such a nature that they spatially align themselves along the relief structure of the embossed coating and in this way form a reflective layer.

WO2016173695 relates to a security element for security papers, value documents, or the like, which consists of a mutlilayer structure capable of interference, wherein the multilayer structure capable of interference has a reflection layer, a dielectric layer, and a partially transparent layer, wherein the dielectric layer is arranged between the reflection layer and the partially transparent layer. According to the invention, the reflection layer of the multilayer structure capable of interference is formed by a colored layer or a further multilayer structure, wherein the colored layer and the multilayer structure are designed in such a way that the colored layer and the multilayer structure exhibit a metallic shade in incident light and a colorful shade in transmitted light.

WO16173696 relates to a security element for security papers, value documents, or the like, which consists of a mutlilayer structure capable of interference, wherein the multilayer structure capable of interference has a reflection layer, a dielectric layer, and a partially transparent layer, wherein the dielectric layer is arranged between the reflection layer and the partially transparent layer, wherein the reflection layer is formed by a colored layer, which comprises comprising platelet shaped transition metal particles having a longest dimension of edge length of from 15 nm to 1000 nm and a thickness of from 2 nm to 100 nm, so that the colored layer exhibit a metallic shade in incident light and a colorful shade in transmitted light.

WO2017114590 relates to a molded plastic film article fora blister, in particular a blister for tablets, comprising a transparent carrier substrate that includes a semi-transparent functional layer which is designed in such a way that the molded plastic film article has a first visible color when viewed in reflected light while having a second visible color when viewed in transmitted light.

WO2017092865 relates to a security element for protecting documents of value, comprising a transparent carrier substrate, a layer containing a diffractive optical element (DOE) and a semi-transparent functional layer which is designed such that the security element has a first visually perceptible color when observed in reflected light and a second visually perceptible color when observed in transmitted light.

WO2017080641 relates to a security element for securing documents of value, comprising a transparent carrier substrate and a first semi-transparent function layer, which has a multi-layer structure having a first semi-transparent metal layer, a second semi-transparent metal layer, and a dielectric layer arranged between the first and the second semi-transparent metal layers, wherein the second semi-transparent metal layer at least partially has a layer thickness greater than the layer thickness of the first semi-transparent metal layer.

WO2017028950 relates to a method for producing a security element, comprising the steps of: a) providing a support which has an embossing lacquer layer that has a first, diffractive structure-forming relief structure, and a second, micromirror arrangement-forming relief structure; b) imprinting the first, diffractive structure-forming relief structure with a printing ink which is based on metallic platelet pigments that are designed in such a way that they spatially align themselves along the relief structure of the embossing lacquer layer; c) imprinting with a soluble wash ink such that the regions of the first, diffractive structure-forming relief structure and the second, micromirror arrangement-forming relief structure form recesses in the applied wash ink; d) applying a colored thin-film element over the whole surface and then washing off the wash ink such that the colored thin-film element remains in the regions of the first, diffractive structure-forming relief structure and the second, micromirror arrangement-forming relief structure in a fashion spatially aligned along the respective relief structure; and e) applying an adhesive layer.

WO2017008897 relates to a security element for safeguarding a valuable document or a security paper, wherein the security element has a layer structure having the following layer sequence: a) a first film substrate; b) a first embossing lacquer layer; c) a first semitransparent functional layer; d) a printed layer applied on the first semitransparent functional layer; e) an adhesive layer; f) a second semitransparent functional layer; g) a second embossing lacquer layer; h) optionally a second film substrate; wherein—the first semitransparent functional layer c) forms a first motif, discernible when the front side of the security element is viewed in reflected light;—the semitransparent second functional layer f) forms a second motif, discernible when the rear side of the security element is viewed in reflected light;—the printed layer d) applied on the first semitransparent functional layer forms a hidden third motif, discernible when the security element is viewed in transmitted light both from the front side and from the rear side.

WO17054922A1 relates to a packaging comprising a plastic film shaped part and a cover film, wherein said plastic film shaped part defines the front side of the packaging and the cover film defines the rear side of the packaging, and the cover film is based on a carrier substrate provided with a semi-transparent functional layer, wherein the semi-transparent functional layer is designed such that the cover film has a first visually-perceptible colour when observed in reflected light, and a second visually-perceptible colour when observed in transmitted light.

WO17008905A3 relates to a data carrier, in particular a document of value or a security paper, comprising a data carrier substrate having a perforated portion and a front face and a rear face, wherein: the front face of the data carrier substrate is provided with a film security element in the perforated portion; the perforated portion of the data carrier substrate is formed by a plurality of cut-outs extending through the data carrier substrate which together form a perforated portion motif, said perforated portion motif not being visible when the front face of the data carrier is viewed under reflected light and being covered by the film security element, and being visible through the film security element when the front face of the data carrier is viewed under transmitted light; and the film security element shows a first appearance when the front face of the data carrier is viewed under reflected light, and shows a second appearance when the front face of the data carrier is viewed under transmitted light, said second appearance complementing the perforated portion motif of the data carrier substrate.

EP2886356B1 is directed to
a method for manufacturing a value document, in particular a banknote, comprising
a) making available a value document substrate (1);
b) applying a flowable, UV-crosslinkable ink layer (2) containing effect pigments to the value document substrate (1) by means of a first screen printing unit;
c) the incomplete crosslinking of the UV crosslinkable ink layer (2) containing effect pigments applied to the value document substrate (1) by means of a first UV-drying device, in order to thus increase the viscosity of the ink layer (2) and to make it embossable;
d) bringing into contact the incompletely crosslinked UV-crosslinkable ink layer (2) containing effect pigments applied to the value document substrate (1) with an embossing tool within a second screen printing unit, in order to thus equip the ink layer with a macroscopic embossed structure, wherein the depressions of the macroscopic embossed structure have a depth in a range from 13 mm to 30 mm;

e) the complete crosslinking of the UV-crosslinkable ink layer (2) containing effect pigments that has been applied to the value document substrate and equipped with an embossed structure by means of a second UV-drying device; and a method for manufacturing a security element, comprising a) making available a foil substrate (1);

b) applying a flowable, UV-crosslinkable ink layer (2) containing effect pigments to the foil substrate (1) by means of a first screen printing unit;

c) the incomplete crosslinking of the UV crosslinkable ink layer (2) containing effect pigments applied to the foil substrate (1) by means of a first UV-drying device, in order to thus increase the viscosity of the ink layer (2) and to make it embossable;

d) bringing into contact the incompletely crosslinked, UV-crosslinkable ink layer (2) containing effect pigments applied to the foil substrate (1) with an embossing tool within a second screen printing unit, in order to thus equip the ink layer (2) with a macroscopic embossed structure, wherein the depressions of the macroscopic embossed structure have a depth in a range from 13 mm to 30 mm;

e) the complete crosslinking of the UV-crosslinkable ink layer (2) containing effect pigments that has been applied to the foil substrate and equipped with an embossed structure by means of a second UV-drying device.

WO14118567A1 relates to a method of manufacturing a security device is provided, comprising: (a) providing a transparent substrate; (b) applying a curable transparent material to a region of the substrate; (c) in a first curing step, partially curing the curable transparent material by exposure to curing energy; (d) applying a layer of a reflection enhancing material to the curable transparent material; (e) forming the partially cured transparent material and the layer of reflection enhancing material such that both surfaces of the layer of reflection enhancing material follow the contours of an optically variable effect generating relief structure; and (f) in a second curing step, fully curing the formed transparent material by exposure to curing energy such that the relief structure is retained by the formed transparent material. Corresponding security devices are also disclosed.

It has now been found, surprisingly, that highly effective security elements can be produced when firstly on at least part of a transparent substrate surface, a first layer showing high gloss (metallic aspect) and comprising transition metal particles showing color due to localized surface plasmon resonance (LSPR) is provided and in a second step on at least part of the first layer a second layer, comprising an organic material having a refractive index of from 1.3 to 2.3 is provided with a thickness of from 20 to 1000 nm.

Accordingly, the present invention is directed to security, or decorative elements, comprising a transparent, or translucent substrate, which may contain indicia or other visible features in or on its surface, and on at least part of the substrate surface, a first layer, comprising transition metal particles having an average diameter (maximum dimension) of from 5 nm to 500 nm and a binder, on at least part of the first layer a second layer, comprising an organic material and having a refractive index of from 1.2 to 2.3, especially 1.2 to 2.0, very especially 1.3 to 1.7, and having a thickness of from 20 to 1000 nm, especially 30 to 700 nm, very especially 30 to 600 nm, wherein the transition metal is silver, copper, gold and palladium, especially silver and copper, very especially silver, wherein the weight ratio of transition metal particles to binder in the first layer is in the range from 20:1 to 1:2 in case the binder is a polymeric binder, or wherein the weight ratio of transition metal particles to binder in the first layer is in the range from 5:1 to 1:15 in case the binder is an UV curable binder.

The security or decorative element, consisting of the substrate, the first and the second layer, exhibits on its coated side an intensive angle dependent color in reflection and the transmission color of the security or decorative element with and without the second layer is essentially the same. Usually the transmission color of the security or decorative element with and without the second layer differs by not more than 5 $\Delta E^*_{ab}$ units.

The color in reflection and the color flop of the security or decorative elements are, for example, controlled by adjusting the refractive index and thickness of the second layer.

In comparison to a security or decorative element, comprising only the first layer, the security or decorative element of the present invention may exhibit a higher chroma, a higher lightness and a stronger angle dependence of the color (flip flop effect) due to the second layer on the first layer comprising the transition metal particles. The transmission color of the security or decorative elements with and without the second layer is essentially the same.

In a preferred embodiment the security or decorative element does not comprise additional layers besides the first and second layer.

The first layer exhibits at least one absorption maximum in the wavelength range of from 400 nm to 1500 nm.

The optical density of the first layer is higher than 0.25 for at least one wavelength in the range of from 400 nm to 750 nm. The optical density is measured with a Macbeth TD904 optical densitometer.

The second layer is preferably transparent and does not contain color pigments.

The first and the second layer can be applied by means of customary processes, for example by means of processes selected from airblade coating, knife coating, airknife coating, squeegee coating, impregnation coating, reverse roll coating, transfer roll coating, gravure coating, kiss coating, flow coating, slot die coating, spray coating, spin coating, or printing processes such as relief printing, gravure printing, intaglio printing, flexographic printing, offset printing, inkjet printing, letterpress printing, pad printing, heatseal printing or screenprinting processes.

The first and the second layer are preferably applied by a printing, or coating method.

The security (or decorative) element consisting of the substrate, the first and the second layer has preferably a gloss value of equal, or higher than 300 relative gloss units, as measured under a 20° angle.

Gloss measurements are well known measurements in the coatings and printing industry and are, for example, carried out with a Hunter or Zehnter ZGM 1120 gloss meter according to ISO 2813; in this case with a 20° geometry.

The first layer is obtained by coating substrate with a composition, comprising
(i) transition metal particles having an average diameter of from 5 nm to 500 nm,
(ii) a binder, and
(iii) optionally a solvent.

The weight ratio of transition metal particles to binder in the first layer is in the range from 20:1 to 1:2 in case the binder is a polymeric binder, or is in the range from 5:1 to 1:15 in case the binder is an UV curable binder (UV curable composition).

In case of a polymeric binder the composition for producing the first layer normally comprises:
  (i) transition metal particles in an amount of 0.5 to 40% by weight, preferably 1 to 30% by weight,
  (ii) a polymeric binder in an amount of from 0.05 to 40% by weight, preferably 0.1 to 30% by weight, and
  (iii) a solvent in an amount of 10 to 99% by weight, preferably 20 to 99% by weight, wherein the amounts of components (i), (ii) and (iii) are based on the total weight of the components (i), (ii) and (iii).

The polymeric binder is described in more detail below. Most preferred, the polymeric binder is selected from the group consisting of nitro cellulose, vinyl chloride, vinyl acetate copolymers, vinyl, acrylic, urethane, polyethyleneterephthalate, terpene phenol, polyolefin, silicone, cellulose, polyamide, polyester and rosin ester resins or mixtures thereof.

In case of an UV curable binder the composition for producing the first layer normally comprises:
  (i) transition metal particles in an amount of 0.5 to 40% by weight, preferably 1 to 30% by weight,
  (ii) an UV curable binder in an amount of from 0.1 to 95% by weight, preferably 0.2 to 90% by weight, and
  (iii) optionally a solvent in an amount of 0 to 99% by weight, preferably 5 to 95% by weight, wherein the amounts of components (i), (ii) and (iii) are based on the total weight of the components (i), (ii) and (iii).

The UV curable binder is described in more detail below.

The transition metal is silver, copper, gold and palladium, especially silver and copper, very especially silver.

The transition metal particles are preferably in the form of platelets and have an average diameter of from 20 nm to 500 nm, and an average thickness of from 2 to 40 nm.

The average diameter of the silver nanoplatelets is the number mean diameter of the silver nanoplatelets.

The average thickness of the silver nanoplatelets is the number mean thickness of the silver nanoplatelets.

The diameter is the longer side of the nanoplatelet (width). The thickness is the shorter side of the nanoplatelet (height).

The mean aspect ratio (defined as the ratio of number mean diameter to number mean thickness) being larger than 1.5, preferably larger than 1.6 and more preferably larger than 1.7.

The aspect ratio of the nanoplatelets is the ratio of its longest dimension, such as, for example, its diameter to its shortest dimension, such as, for example, its thickness. For example, the aspect ratio of a disk is the ratio of its diameter to its thickness.

Most preferred the transition metal particles are silver particles.

If the silver particles are in the shape of nanoplatelets and have an average thickness of 8 to 25 nm and an average diameter of 15 to 40 nm, the security or decorative element may show a brown, or orange color in transmission and the reflection color and the color flop of the security or decorative element are controlled by adjusting the refractive index and thickness of the second layer.

If the silver particles are in the shape of nanoplatelets and have an average thickness of 8 to 25 nm and an average diameter of 30 to 70 nm, the security or decorative element may show a red, or magenta color in transmission and the reflection color and the color flop of the security or decorative element are controlled by adjusting the refractive index and thickness of the second layer.

If the silver particles are in the shape of nanoplatelets and have an average thickness of 8 to 25 nm and an average diameter of 50 to 150 nm, the security or decorative element may show a turquoise, or blue color in transmission and the reflection color and the color flop of the security or decorative element are controlled by adjusting the refractive index and thickness of the second layer.

Advantageously, silver nanoplatelets described in PCT/EP2019/078469 (European patent application no. 18202669.0) can be used. PCT/EP2019/078469 relates to compositions, comprising silver nanoplatelets, wherein the mean diameter of the silver nanoplatelets, present in the composition, is in the range of 20 to 70 nm with standard deviation being less than 50% and the mean thickness of the silver nanoplatelets, present in the composition, is in the range of 5 to 30 nm with standard deviation being less than 50%. A coating, comprising the composition, shows a red, or magenta color in transmission and a greenish-metallic color in reflection.

The mean aspect ratio of the silver nanoplatelets is higher than 1.5.

The silver nanoplatelets may be in the form of disks, regular hexagons, triangles, especially equilateral triangles, and truncated triangles, especially truncated equilateral triangles, or mixtures thereof. They are preferably in the form of disks, truncated triangles, hexagons, or mixtures thereof.

In addition, PCT/EP2019/078469 also describes surface modified silver nanoparticles which bear a surface stabilizing agent of formula (I) and optionally further stabilizing agents described below on their surface.

The mean diameter of the silver nanoplatelets is in the range of 20 to 70 nm, preferably 25 to 65 nm, more preferably 35 to 55 nm. The standard deviation being less than 50%, preferably less than 40%.

The mean thickness of the silver nanoplatelets is in the range of 5 to 30 nm, preferably 7-25 nm, more preferably 8 to 25 nm. The standard deviation being less than 50%, preferably less than 40%.

The diameter is the longer side of the nanoplatelet (width). The thickness is the shorter side of the nanoplatelet (height).

The mean aspect ratio (defined as the ratio of mean diameter to mean thickness) being larger than 1.5, preferably larger than 1.6 and more preferably larger than 1.7.

The aspect ratio of the nanoparticles is the ratio of its longest dimension, such as, for example, its diameter to its shortest dimension, such as, for example, its thickness. For example, the aspect ratio of a disk is the ratio of its diameter to its thickness.

The highest wavelength absorption maximum of the population of all silver nanoplatelets in the composition being within the range of 450 to 550 nm, preferably 460 to 540 nm, most preferably 465 to 535 nm (measured in water at ca. $5*10^{-5}$ M (mol/l) concentration of silver).

The absorption maximum has a full width at half maximum (FWHM) value in the range of 20 to 180 nm, preferably 30 to 150 nm, more preferably 35 to 130 nm.

The silver nanoparticles may bear a surface stabilizing agent of formula

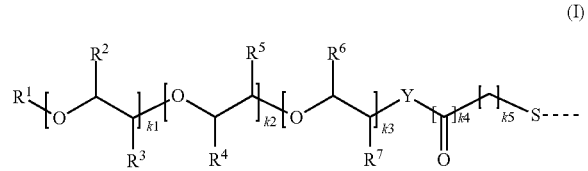

(I)

on their surface, wherein ---------- indicates the bond to the silver,
$R^1$ is H, $C_1$-$C_{18}$alkyl, phenyl, $C_1$-$C_8$alkylphenyl, or $CH_2COOH$;
$R^2$, $R^3$, $R^4$, $R^5$, $R^6$ and $R^7$ are independently of each other H, $C_1$-$C_8$alkyl, or phenyl;
Y is O, or $NR^8$;
$R^8$ is H, or $C_1$-$C_8$alkyl;
k1 is an integer in the range of from 1 to 500,
k2 and k3 are independently of each other 0, or integers in the range of from 1 to 250;
k4 is 0, or 1,
k5 is an integer in the range of from 1 to 5.
Y is preferably O. k4 is preferably 0.

The surface stabilizing agent of formula (I) has preferably a number average molecular weight of from 1000 to 20000, and more preferably from 1000 to 10000, most preferred from 1000 to 6000. All molecular weights specified in this text have the unit of [g/mol] and refer, unless indicated otherwise, to the number average molecular weight (Mn).

The most preferred surface stabilizing agent has the formula

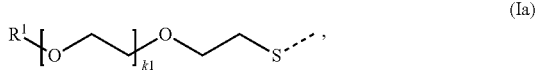

(Ia)

wherein $R^1$ is H, or a $C_1$-$C_8$alkyl group, and k1 is 22 to 450, especially 22 to 150.
$R^1$ is preferably H, or $CH_3$.

The most preferred surface stabilizing agents are derived from MPEG thiols (poly(ethylene glycol) methyl ether thiols) having an average $M_n$ of 2000 to 6000, such as, for example, MPEG 2000 thiol (A-1, average $M_n$ 2,000), MPEG 3000 thiol (A-2), MPEG 4000 thiol (A-3) MPEG 5000 thiol (A-4), MPEG 6000 thiol (A-5), PEG thiols (O-(2-mercaptoethyl)-poly(ethylene glycol)) having an average $M_n$ of 2000 to 6000, such as, for example, PEG 2000 thiol (A-6, average $M_n$ 2,000), PEG 3000 thiol (A-7), PEG 4000 thiol (A-8), PEG 5000 thiol (A-9), PEG 6000 thiol (A-10).

In addition to the surface stabilizing agents the composition may comprise further stabilization agents. Stabilizing agents may include, for example, phosphines; phosphine oxides; alkyl phosphonic acids; oligoamines, such as ethylenediamine, diethylene triamine, triethylene tetramine, spermidine, spermine; compounds of formula (IIa), (IIb) and (IIc) described below; surfactants; dendrimers, and salts and combinations thereof.

Surfactants include, for example, anionic surfactants, cationic surfactants, nonionic surfactants, amphoteric or zwitterionic surfactants.

The stabilizing agent may be a compound of formula $R^{20}$—X (IIa), wherein $R^{20}$ a linear or branched $C_1$-$C_{25}$alkyl group, or $C_1$-$C_{25}$alkenyl group, which may be substituted by one, or more groups selected from —OH, —SH, —$NH_2$, or —$COOR^{19}$, wherein $R^{19}$ is a hydrogen atom, or a $C_1$-$C_{25}$alkyl group, and X is —OH, —SH, —$NH_2$, or —$COOR^{19'}$, wherein $R^{19'}$ is a hydrogen atom, a $C_1$-$C_{25}$alkyl group, or a $C_2$-$C_{25}$alkenyl group, which may be substituted by one, or more groups selected from —OH, —SH, —$NH_2$, or —$COOR^{19''}$, wherein $R^{19''}$ is a hydrogen atom, or a $C_1$-$C_{25}$alkyl group.

Examples of compounds of formula (IIa) are 1-methylamine, 1-dodecylamine, 1-hexadecylamine, citric acid, oleic acid, D-cysteine, 1-dodecanethiol, 9-mercapto-1-nonanol, 1-thioglycerol, 11-amino-1-undecanethiol, cysteamine, 3-mercaptopropanoic acid, 8-mercaptooctanoic acid and 1,2-ethanedithiol.

The stabilizing agent may be a compound of formula

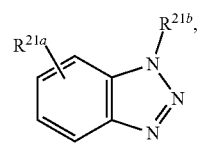

(IIb)

wherein
$R^{21a}$ is a hydrogen atom, a halogen atom, a $C_1$-$C_8$alkoxy group, or a $C_1$-$C_8$alkyl group,
$R^{21b}$ is a hydrogen atom, or a group of formula —$CHR^{24}$—$N(R^{22})(R^{23})$,
$R^{22}$ and $R^{23}$ are independently of each other a $C_1$-$C_8$alkyl, a hydroxy $C_1$-$C_8$alkyl group, or a group of formula —[($CH_2CH_2$)—O]$_{n1}$—$CH_2CH_2$—OH, wherein n1 is 1 to 5, $R^{24}$ is H or $C_1$-$C_8$alkyl.

Examples of compounds of formula (IIb) are

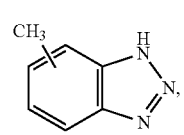

(B-1)

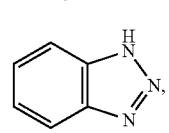

(B-2)

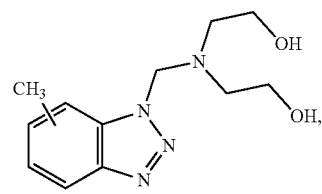

(B-3)

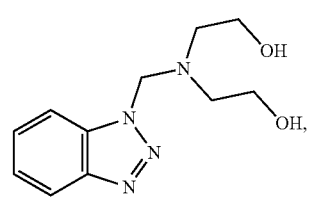

(B-4)

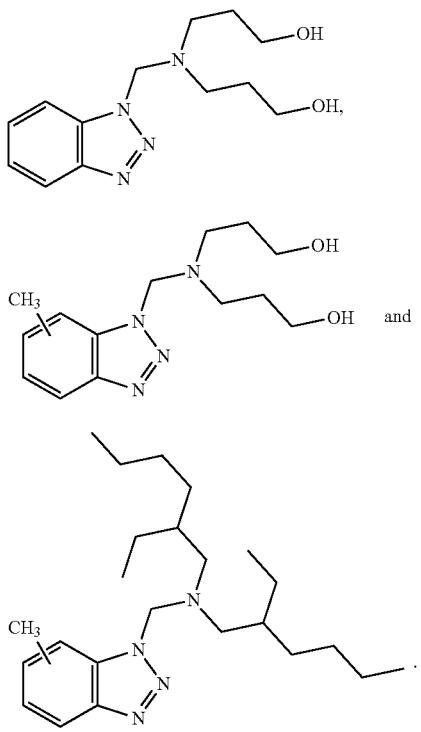

(B-5)

(B-6)

(B-7)

In another preferred embodiment the stabilizing agent is a "polyhydric phenol", which is a compound, containing an optionally substituted benzene ring and at least 2 hydroxy groups attached to it. The term "polyhydric phenol" comprises polyphenols, such as, for example, tannic acid and polycyclic aromatic hydrocarbons which consist of fused benzene rings, wherein at least one benzene ring has at least 2 hydroxy groups attached to it, such as, for example, 1,2-dihydroxynaphthalene. The "polyhydric phenol" may be substituted. Suitable substituents are described below.

The polyhydric phenol is preferably a compound of formula

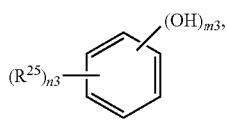

(IIc)

wherein $R^{25}$ can be the same, or different in each occurrence and is a hydrogen atom, a halogen atom, a $C_1$-$C_{18}$alkyl group, a $C_1$-$C_{18}$alkoxy group, or a group —C(=O)—$R^{26}$, $R^{26}$ is a hydrogen atom, a hydroxy group, a $C_1$-$C_{18}$alkyl group, unsubstituted or substituted amino group, unsubstituted or substituted phenyl group, or a $C_1$-$C_{18}$alkoxy group, and n3 is a number of 1 to 4, m3 is a number of 2 to 4, and the sum of m3 and n3 is 6.

The polyhydric phenol is more preferably a compound of formula

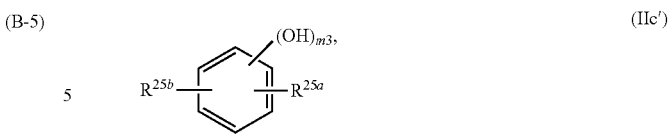

(IIc′)

wherein $R^{25a}$ and $R^{25b}$ are independently of each other a hydrogen atom, a $C_1$-$C_{18}$alkyl group, a $C_1$-$C_{18}$alkoxy group, or a group of formula —C(=O)—$R^{26}$, $R^{26}$ is a hydrogen atom, a hydroxy group, a $C_1$-$C_{18}$alkyl group, an unsubstituted or substituted amino group, unsubstituted or substituted phenyl group, or a $C_1$-$C_{18}$alkoxy group, and m3 is a number of 2 to 4, especially 2 to 3. Polyhydric phenols are preferred, which have two hydroxy groups in ortho-position.

Even more preferably, the polyhydric phenol is a compound of formula

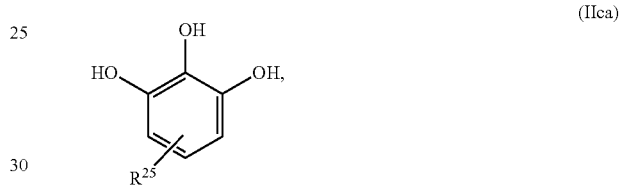

(IIca)

wherein $R^{25}$ is a hydrogen atom, or a group of formula —C(=O)—$R^{26}$, wherein $R^{26}$ is a hydrogen atom, a $C_1$-$C_{18}$alkyl group, or a $C_1$-$C_{18}$alkoxy group, an unsubstituted or substituted amino group, especially a $C_1$-$C_{18}$alkyl group or $C_1$-$C_8$alkoxy group.

Most preferred, the polyhydric phenol is a compound of formula

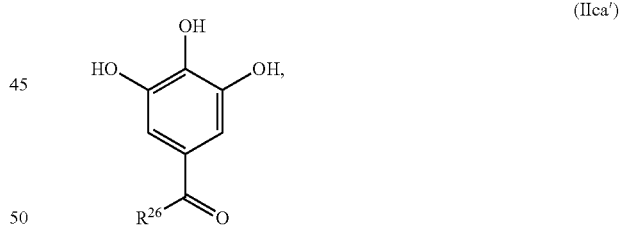

(IIca′)

wherein $R^{26}$ is a hydrogen atom, a $C_1$-$C_{18}$alkyl group, or a $C_1$-$C_{18}$alkoxy group, especially a $C_1$-$C_8$alkoxy group, such as, for example,

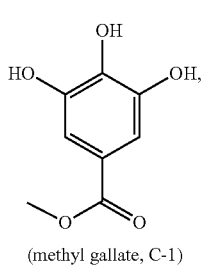

(methyl gallate, C-1)

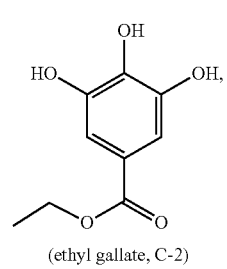

(ethyl gallate, C-2)

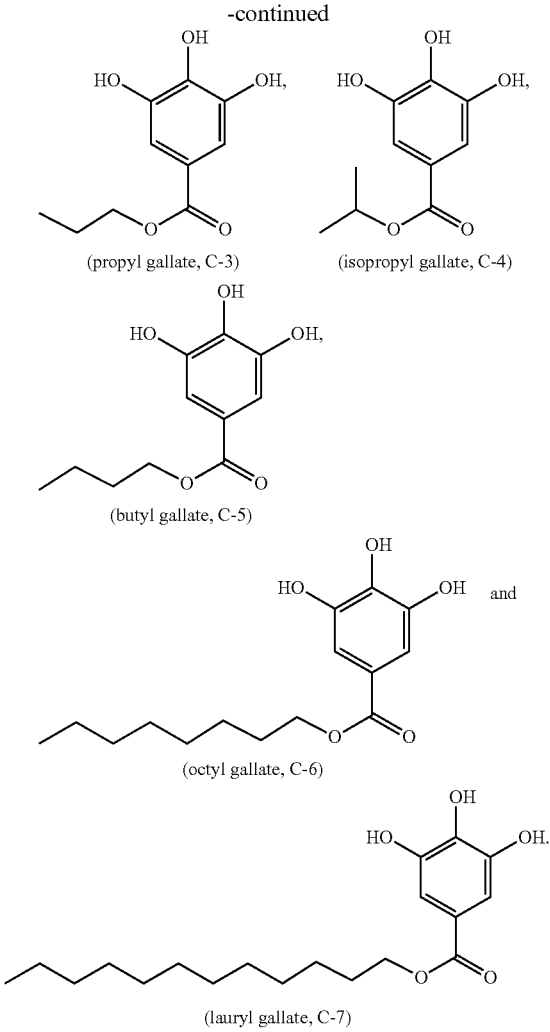

(propyl gallate, C-3)  (isopropyl gallate, C-4)

(butyl gallate, C-5)

(octyl gallate, C-6)

(lauryl gallate, C-7)

In another preferred embodiment of the present invention the polyhydric phenols are compounds of formula

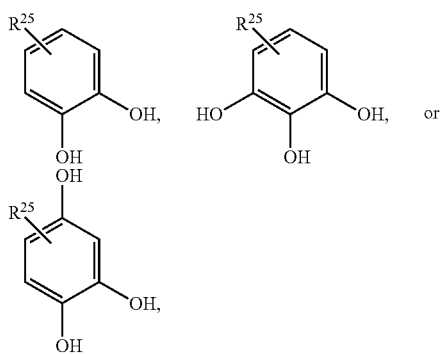

wherein $R^{25}$ is a hydrogen atom, a $C_1$-$C_{18}$alkyl group, or a group of formula —C(=O)—$R^{26}$, wherein $R^{26}$ is a hydrogen atom, a hydroxy group, a $C_1$-$C_{18}$alkyl group, or a $C_1$-$C_{18}$alkoxy group, an unsubstituted or substituted amino group, an unsubstituted or substituted phenyl group, especially a $C_1$-$C_{18}$alkyl group or $C_1$-$C_8$alkoxy group, such as, for example,

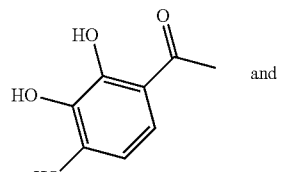

(C-8)

and

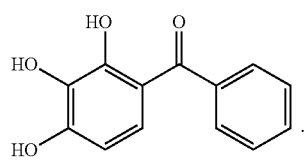

(C-9)

An unsubstituted or substituted amino group is, for example, a group of formula —$NR^{27}R^{28}$, wherein $R^{27}$ and $R^{28}$ are independently of each other a hydrogen atom, a $C_1$-$C_{18}$alkyl group, a phenyl group, preferably a hydrogen atom, or a $C_1$-$C_{18}$alkyl group.

In a particularly preferred embodiment the stabilizing agent is selected from compounds of formula (IIb), (IIc), or mixtures thereof.

The security or decorative element may comprise on at least part of the substrate surface the first layer, comprising the transition metal particles, on part of the first layer the second layer in a defined shape, such as, for example, a symbol, a stripe, a geometrical shape, a design, lettering, an alphanumeric character, the representation of an object or parts thereof.

The substrate may comprise in or on its surface an optically variable image.

The security or decorative element may comprise on at least part of the second layer a third layer which is partially transparent.

The solvent is preferably selected from alcohols (such as methanol, ethanol, 1-propanol, 2-propanol, 1-butanol, 2-butanol, isobutanol, tert-butanol, tert-pentanol), cyclic or acyclic ethers (such as diethyl ether, tetrahydrofuran and 2-methyltetrahydrofurane), ketones (such as acetone, 2-butanone, 3-pentanone), ether-alcohols (such as 2-methoxyethanol, 1-methoxy-2-propanol, ethylene glycol monobutyl ether, diethylene glycol monoethyl ether, diethylene glycol monopropyl ether, and diethylene glycol monobutyl ether), esters (such as ethyl acetate, ethyl propionate, and ethyl 3-ethoxypropionate), polar aprotic solvents (such as acetonitrile, dimethyl formamide, and dimethyl sulfoxide), mixtures thereof and mixtures with water. The preferred solvents include $C_2$-$C_6$alcohols, ethers, ether-alcohols, mixtures thereof and mixtures with water.

The binder can be of organic or hybrid nature. Hybrid materials contain inorganic and organic components.

Preferably, the binder is a high-molecular-weight organic compound (polymeric binder) conventionally used in coating compositions. High molecular weight organic materials usually have molecular weights of about from $10^3$ to $10^8$ g/mol or even more. They may be, for example, natural resins, drying oils, rubber or casein, or natural substances derived therefrom, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA.

With respect to the polymeric binder, a thermoplastic resin may be used, examples of which include, polyethylene based polymers [polyethylene (PE), ethylene-vinyl acetate copolymer (EVA), vinyl chloride-vinyl acetate copolymer, vinyl alcohol-vinyl acetate copolymer, polypropylene (PP), vinyl based polymers [poly(vinyl chloride) (PVC), poly (vinyl butyral) (PVB), poly(vinyl alcohol) (PVA), poly (vinylidene chloride) (PVdC), poly(vinyl acetate) (PVAc), poly(vinyl formal) (PVF)], polystyrene based polymers [polystyrene (PS), styrene-acrylonitrile copolymer (AS), acrylonitrile-butadiene-styrene copolymer (ABS)], acrylic based polymers [poly(methyl methacrylate) (PMMA), MMA-styrene copolymer], polycarbonate (PC), celluloses [ethyl cellulose (EC), cellulose acetate (CA), propyl cellulose (CP), cellulose acetate butyrate (CAB), cellulose nitrate (CN), also known as nitrocellulose], fluorin based polymers [polychlorofluoroethylene (PCTFE), polytetrafluoroethylene (PTFE), tetrafluoroethylene-hexafluoroethylene copolymer (FEP), poly(vinylidene fluoride) (PVdF)], urethane based polymers (PU), nylons [type 6, type 66, type 610, type 11], polyesters (alkyl) [polyethylene terephthalate (PET), polybutylene terephthalate (PBT), polycyclohexane terephthalate (PCT)], novolac type phenolic resins, or the like. In addition, thermosetting resins such as resol type phenolic resin, a urea resin, a melamine resin, a polyurethane resin, an epoxy resin, an unsaturated polyester and the like, and natural resins such as protein, gum, shellac, copal, starch and rosin may also be used.

The polymeric binder preferably comprises nitrocellulose, ethyl cellulose, cellulose acetate, cellulose acetate propionate (CAP), cellulose acetate butyrate (CAB), hydroxyethyl cellulose (HEC), hydroxypropyl cellulose (HPC), alcohol soluble propionate (ASP), vinyl chloride, vinyl acetate copolymers, vinyl acetate, vinyl, acrylic, polyurethane, polyamide, rosin ester, hydrocarbon, aldehyde, ketone, urethane, polythyleneterephthalate, terpene phenol, polyolefin, silicone, cellulose, polyamide, polyester, rosin ester resins, shellac and mixtures thereof, most preferred are soluble cellulose derivatives such as hydroxylethyl cellulose, hydroxypropyl cellulose, nitrocellulose, carboxymethylcellulose as well as chitosan and agarose, in particular hydroxyethyl cellulose and hydroxypropyl cellulose.

Most preferred, the polymeric binder is selected from the group consisting of nitro cellulose, vinyl chloride, vinyl acetate copolymers, vinyl, acrylic, urethane, polyethyleneterephthalate, terpene phenol, polyolefin, silicone, cellulose, polyamide, polyester and rosin ester resins or mixtures thereof.

Alternatively, the composition, comprising the transition metal particles may be an UV curable composition (UV curable binder). Such a composition comprises besides the transition metal particles, photoinitiator(s), unsaturated compound(s) including one or more olefinic double bonds (binder) and optionally a solvent. Possible photoinitiator(s), unsaturated compound(s) including one or more olefinic double bonds (binder) and a solvent are described below in more detail with respect to the UV curable composition used for the production of the second layer.

The UV curable composition is preferably deposited by means of gravure, offset flexographic, ink jet, offset and screen printing process.

The second layer, comprising the organic material may be obtained by depositing a polymeric binder composition on the first layer, comprising transition metal particles, and drying it.

Alternatively, the second layer, comprising the organic material may be obtained by depositing an UV curable binder (UV curable composition) on the first layer, comprising transition metal particles, and curing it. UV curing can be replaced by EB curing, thus eliminating the need for a photoinitiator.

The UV curable composition is preferably deposited by means of gravure, offset flexographic, ink jet, offset and screen printing process.

The UV curable composition comprises photoinitiator(s) and unsaturated compound(s) including one or more olefinic double bonds (binder).

Examples of photoinitiators are known to the person skilled in the art and for example published by Kurt Dietliker in "A compilation of photoinitiators commercially available for UV today", Sita Technology Textbook, Edinburgh, London, 2002.

Examples of suitable acylphosphine oxide compounds are of the formula XII

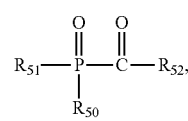

(XII)

wherein
  $R_{50}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$;
  or $R_{50}$ is unsubstituted $C_1$-$C_{20}$alkyl or is $C_1$-$C_{20}$alkyl which is substituted by one or more halogen, $C_1$-$C_{12}$alkoxy, $C_1$-$C_{12}$alkylthio, $NR_{53}R_{54}$ or by —(CO)—O—$C_1$-$C_{24}$alkyl;
  $R_{51}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$; or $R_{51}$ is —(CO)R'$_{52}$;
  or $R_{51}$ is $C_1$-$C_{12}$alkyl which is unsubstituted or substituted by one or more halogen, $C_1$-$C_{12}$alkoxy, $C_1$-$C_{12}$alkylthio, or by $NR_{53}R_{54}$;
  $R_{52}$ and $R'_{52}$ independently of each other are unsubstituted cyclohexyl, cyclopentyl, phenyl, naphthyl or biphenylyl, or are cyclohexyl, cyclopentyl, phenyl, naphthyl or biphenylyl substituted by one or more halogen, $C_1$-$C_4$alkyl or $C_1$-$C_4$alkoxy; or $R_{52}$ is a 5- or 6-membered heterocyclic ring comprising an S atom or N atom;
  $R_{53}$ and $R_{54}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms;
  or $R_{53}$ and $R_{54}$ independently of one another are $C_2$-$C_{12}$-alkenyl, cyclopentyl, cyclohexyl, benzyl or phenyl;

Specific examples are bis(2,4,6-trimethylbenzoyl)-phenylphosphine oxide; 2,4,6-trimethylbenzoyl-diphenyl-phosphine oxide; ethyl (2,4,6 trimethylbenzoyl phenyl) phosphinic acid ester; (2,4,6-trimethylbenzoyl)-2,4-dipentoxyphenylphosphine oxide, bis(2,6-dimethoxybenzoyl)-2,4,4-trimethylpentylphosphine oxide.

Interesting further are mixtures of the compounds of the formula XII with compounds of the formula XI as well as mixtures of different compounds of the formula XII.

Examples are mixtures of bis(2,6-dimethoxybenzoyl)-2,4,4-trimethylpentylphosphine oxide with 1-hydroxy-cyclohexyl-phenyl-ketone, of bis(2,4,6-trimethylbenzoyl)-phenylphosphine oxide with 2-hydroxy-2-methyl-1-phenyl-propan-1-one, of bis(2,4,6-trimethylbenzoyl)-phenylphosphine oxide with ethyl (2,4,6 trimethylbenzoyl phenyl) phosphinic acid ester, etc. Examples of suitable benzophenone compounds are compounds of the formula X:

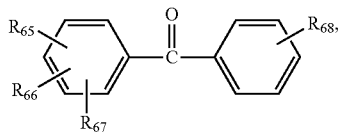
(X)

wherein
$R_{65}$, $R_{66}$ and $R_{67}$ independently of one another are hydrogen, $C_1$-$C_4$alkyl, $C_1$-$C_4$-halogenalkyl, $C_1$-$C_4$alkoxy, Cl or $N(C_1$-$C_4$alkyl$)_2$;
$R_{68}$ is hydrogen, $C_1$-$C_4$alkyl, $C_1$-$C_4$halogenalkyl, phenyl, $N(C_1$-$C_4$alkyl$)_2$, $COOCH_3$,

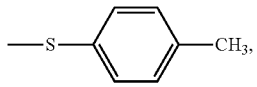

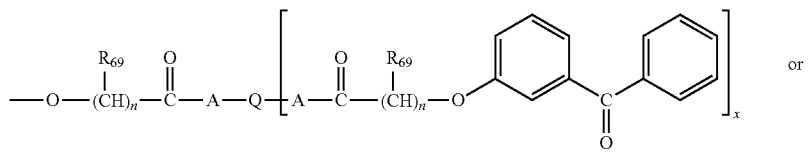
or

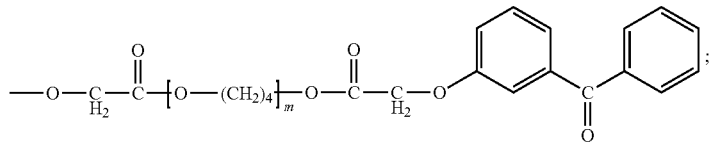

Q is a residue of a polyhydroxy compound having 2 to 6 hydroxy groups;
x is a number greater than 1 but no greater than the number of available hydroxyl groups in Q;
A is —[O(CH$_2$)$_b$CO]$_y$— or —[O(CH$_2$)$_b$CO]$_{(y-1)}$—[O(CHR$_{71}$CHR$_{70}$)$_a$]$_y$—;
$R_{69}$ is hydrogen, methyl or ethyl; and if N is greater than 1 the radicals $R_{69}$ may be the same as or different from each other;

| a | is a number from 1 to 2; |
| b | is a number from 4 to 5; |
| y | is a number from 1 to 10; |
| n | is ; and |
| m | is an integer 2-10. |

Specific examples are benzophenone, a mixture of 2,4,6-trimethylbenzophenone and 4-methylbenzophenone, 4-phenylbenzophenone, 4-methoxybenzophenone, 4,4'-dimethoxybenzophenone, 4,4'-dimethylbenzophenone, 4,4'-dichlorobenzophenone, 4,4'-dimethylaminobenzophenone, 4,4'-diethylaminobenzophenone, 4-methylbenzophenone, 2,4,6-trimethylbenzophenone, 4-(4-methylthiophenyl)benzophenone, 3,3'-dimethyl-4-methoxybenzophenone, methyl-2-benzoylbenzoate, 4-(2-hydroxyethylthio)benzophenone, 4-(4-tolylthio)benzophenone, 4-benzoyl-N,N,N-trimethylbenzenemethanaminium chloride, 2-hydroxy-3-(4-benzoylphenoxy)-N,N,N-trimethyl-1-propanaminium chloride monohydrate, 4-(13-acryloyl-1,4,7,10,13-pentaoxatridecyl)benzophenone, 4-benzoyl-N,N-dimethyl-N[2-(1-oxo-2-propenyl)oxy]ethylbenzenemethanaminium chloride; [4-(2-hydroxy-ethylsulfanyl)-phenyl]-(4-isopropylphenyl)-methanone; biphenyl-[4-(2-hydroxy-ethylsulfanyl)-phenyl]-methanone; biphenyl-4-yl-phenyl-methanone; biphenyl-4-yl-p-tolyl-methanone; biphenyl-4-yl-m-tolyl-methanone; [4-(2-hydroxy-ethylsulfanyl)-phenyl]-p-tolyl-methanone; [4-(2-hydroxy-ethylsulfanyl)-phenyl]-(4-isopropyl-phenyl)-methanone; [4-(2-hydroxy-ethylsulfanyl)-phenyl]-(4-methoxy-phenyl)-methanone; 1-(4-benzoyl-phenoxy)-propan-2-one; [4-(2-hydroxy-ethylsulfanyl)-phenyl]-(4-phenoxy-phenyl)-methanone; 3-(4-benzoyl-phenyl)-2-dimethylamino-2-methyl-1-phenyl-propan-1-one; (4-chloro-phenyl)-(4-octylsulfanyl-phenyl)-methanone; (4-chloro-phenyl)-(4-dodecylsulfanyl-phenyl)-methanone; (4-bromo-phenyl)-(4-octylsulfanyl-phenyl)-methanone; (4-dodecylsulfanyl-phenyl)-(4-methoxy-phenyl)-methanone; (4-benzoyl-phenoxy)-acetic acid methyl ester; biphenyl-[4-(2-hydroxy-ethylsulfanyl)-phenyl]-methanone; 1-[4-(4-benzoylphenylsulfanyl)phenyl]-2-methyl-2-(4-methylphenylsulfonyl)propan-1-one.

Examples of suitable alpha-hydroxy ketone, alpha-alkoxyketone or alpha-aminoketone compounds are of the formula (XI)

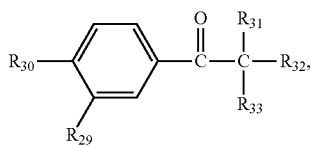

wherein $R_{29}$ is hydrogen or $C_1$-$C_{18}$alkoxy;

$R_{30}$ is hydrogen, $C_1$-$C_{18}$alkyl, $C_1$-$C_{12}$hydroxyalkyl, $C_1$-$C_{18}$alkoxy, $OCH_2CH_2$—$OR_{34}$, morpholino, S—$C_1$-$C_{18}$alkyl, a group —HC=$CH_2$, —C($CH_3$)=$CH_2$,

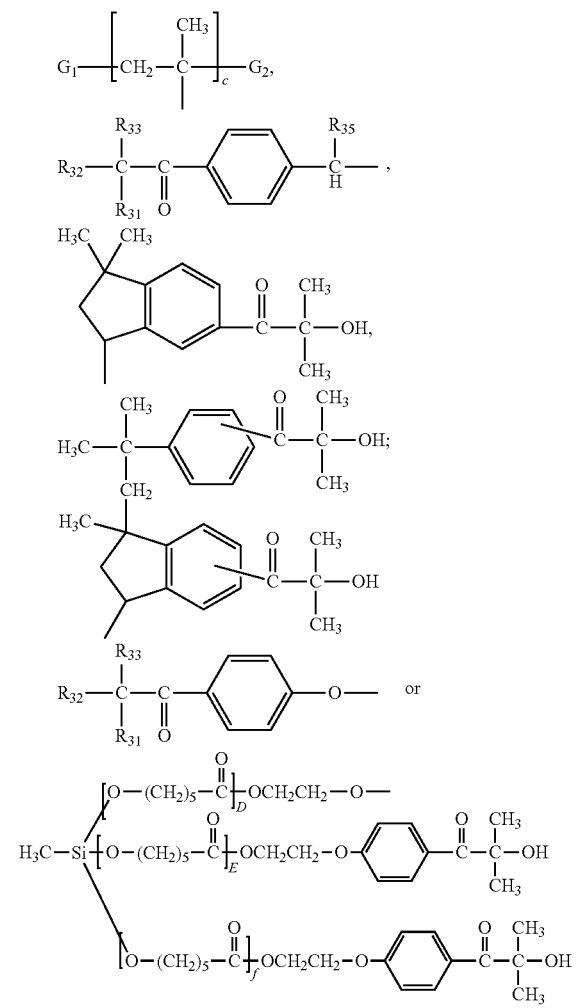

d, e and f are 1-3;

c is 2-10;

$G_1$ and $G_2$ independently of one another are end groups of the polymeric structure, preferably hydrogen or methyl;

$R_{34}$ is hydrogen,

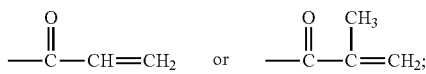

$R_{31}$ is hydroxy, $C_1$-$C_{16}$alkoxy, morpholino, dimethylamino or —O($CH_2CH_2O$)$_g$—$C_1$-$C_{16}$alkyl;

g is 1-20;

$R_{32}$ and $R_{33}$ independently of one another are hydrogen, $C_1$-$C_6$alkyl, $C_1$-$C_{16}$alkoxy or —O($CH_2CH_2O$)$_g$—$C_1$-$C_{16}$alkyl; or are unsubstituted phenyl or benzyl; or phenyl or benzyl substituted by $C_1$-$C_{12}$-alkyl; or $R_{32}$ and $R_{33}$ together with the carbon atom to which they are attached form a cyclohexyl ring;

$R_{35}$ is hydrogen, $OR_{36}$ or $NR_{37}R_{38}$;

$R_{36}$ is hydrogen, $C_1$-$C_{12}$alkyl which optionally is interrupted by one or more non-consecutive O-atoms and which uninterrupted or interrupted $C_1$-$C_{12}$alkyl optionally is substituted by one or more OH, or

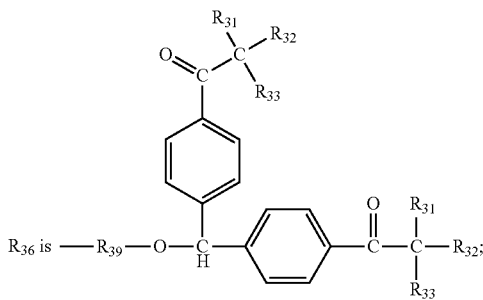

$R_{37}$ and $R_{38}$ independently of each other are hydrogen or $C_1$-$C_{12}$alkyl which is unsubstituted or is substituted by one or more OH;

$R_{39}$ is $C_1$-$C_{12}$alkylene which optionally is interrupted by one or more non-consecutive O, —(CO)—NH—$C_1$-$C_{12}$alkylene-NH—(CO)— or

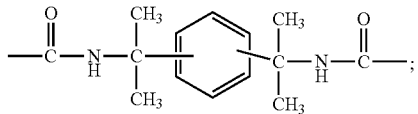

with the proviso that $R_{31}$, $R_{32}$ and $R_{33}$ not all together are $C_1$-$C_{16}$alkoxy or —O($CH_2CH_2O$)$_g$—$C_1$-$C_{16}$alkyl.

Specific examples are 1-hydroxy-cyclohexyl-phenyl-ketone (optionally in admixture with benzophenone), 2-methyl-1[4-(methylthio)phenyl]-2-morpholinopropan-1-one, 2-benzyl-2-dimethylamino-1-(4-morpholinophenyl)-butan-1-one, 2-dimethylamino-2-(4-methyl-benzyl)-1-(4-morpholin-4-yl-phenyl)-butan-1-one, (3,4-dimethoxy-benzoyl)-1-benzyl-1-di-methylamino propane, 1[4-(2-hydroxyethoxy)-phenyl]-2-hydroxy-2-methyl-1-propan-1-one, 2,2-dimethoxy-1,2-diphenylethan-1-one, 2-hydroxy-2-methyl-1-phenyl-propan-1-one, 2-hydroxy-1-{4-[4-(2-hydroxy-2-methyl-propionyl)-benzyl]-phenyl}-2-methyl-propan-1-one, 2-hydroxy-1-{4-[4-(2-hydroxy-2-methyl-propionyl)-phenoxy]-phenyl}-2-methyl-propan-1-one, 2-hydroxy-1-{1-[4-(2-hydroxy-2-methyl-propionyl)-phenyl]-1,3,3-trimethyl-indan-5-yl}-2-methyl-propan-1-one.

Examples of suitable phenylglyoxylate compounds are of the formula XIII

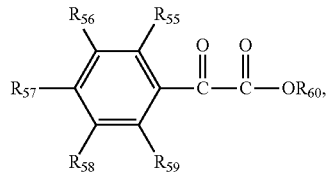

(XIII)

wherein

R$_{60}$ is hydrogen, C$_1$-C$_{12}$alkyl or

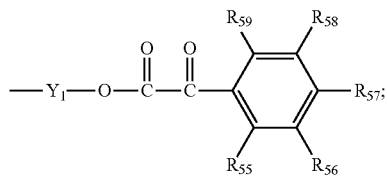

R$_{55}$, R$_{56}$, R$_{57}$, R$_{58}$ and R$_{59}$ independently of one another are hydrogen, unsubstituted C$_1$-C$_{12}$alkyl or C$_1$-C$_{12}$alkyl substituted by one or more OH, C$_1$-C$_4$alkoxy, phenyl, naphthyl, halogen or by CN; wherein the alkyl chain optionally is interrupted by one or more oxygen atoms; or R$_{55}$, R$_{56}$, R$_{57}$, R$_{58}$ and R$_{59}$ independently of one another are C$_1$-C$_4$alkoxy, C$_1$-C$_4$alkythio or NR$_{52}$R$_{53}$;

R$_{52}$ and R$_{53}$ independently of one another are hydrogen, unsubstituted C$_1$-C$_{12}$alkyl or C$_1$-C$_{12}$alkyl substituted by one or more OH or SH wherein the alkyl chain optionally is interrupted by one to four oxygen atoms; or R$_{52}$ and R$_{53}$ independently of one another are C$_2$-C$_{12}$-alkenyl, cyclopentyl, cyclohexyl, benzyl or phenyl; and Y$_1$ is C$_1$-C$_{12}$alkylene optionally interrupted by one or more oxygen atoms.

Specific examples of the compounds of the formula XIII are oxo-phenyl-acetic acid 2-[2-(2-oxo-2-phenyl-acetoxy)-ethoxy]-ethyl ester, methyl α-oxo benzeneacetate. Examples of suitable oxime ester compounds are of the formula XIV

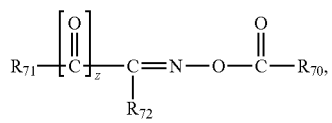

(XIV)

wherein z is 0 or 1;

R$_{70}$ is hydrogen, C$_3$-C$_8$cycloalkyl; C$_1$-C$_{12}$alkyl which is unsubstituted or substituted by one or more halogen, phenyl or by CN; or R$_{70}$ is C$_2$-C$_5$alkenyl; phenyl which is unsubstituted or substituted by one or more C$_1$-C$_6$alkyl, halogen, CN, OR$_{73}$, SR$_{74}$ or by NR$_{75}$R$_{76}$; or R$_{70}$ is C$_1$-C$_8$alkoxy, benzyloxy; or phenoxy which is unsubstituted or substituted by one or more C$_1$-C$_6$alkyl or by halogen;

R$_{71}$ is phenyl, naphthyl, benzoyl or naphthoyl, each of which is substituted by one or more halogen, C$_1$-C$_{12}$alkyl, C$_3$-C$_8$cycloalkyl, benzyl, phenoxycarbonyl, C$_2$-C$_{12}$alkoxycarbonyl, OR$_{73}$, SR$_{74}$, SOR$_{74}$, SO$_2$R$_{74}$ or by NR$_{75}$R$_{76}$, wherein the substituents OR$_{73}$, SR$_{74}$ and NR$_{75}$R$_{76}$ optionally form 5- or 6-membered rings via the radicals R$_{73}$, R$_{74}$, R$_{75}$ and/or R$_{76}$ with further substituents on the phenyl or naphthyl ring; or each of which is substituted by phenyl or by phenyl which is substituted by one or more OR$_{73}$, SR$_{74}$ or by NR$_{75}$R$_{66}$;

or R$_{71}$ is thioxanthyl, or

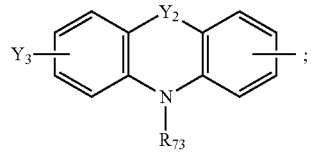

R$_{72}$ is hydrogen; unsubstituted C$_1$-C$_{20}$alkyl or C$_1$-C$_{20}$alkyl which is substituted by one or more halogen, OR$_{73}$, SR$_{74}$, C$_3$-C$_8$cycloalkyl or by phenyl; or is C$_3$-C$_8$cycloalkyl; or is phenyl which is unsubstituted or substituted by one or more C$_1$-C$_6$alkyl, phenyl, halogen, OR$_{73}$, SR$_{74}$ or by NR$_{75}$R$_{76}$; or is C$_2$-C$_{20}$alkanoyl or benzoyl which is unsubstituted or substituted by one or more C$_1$-C$_6$alkyl, phenyl, OR$_{73}$, SR$_{74}$ or by NR$_{75}$R$_{76}$; or is C$_2$-C$_{12}$alkoxycarbonyl, phenoxycarbonyl, CN, CONR$_{75}$R$_{76}$, NO$_2$, C$_1$-C$_4$haloalkyl, S(O)$_y$—C$_1$-C$_6$alkyl, or S(O)$_y$-phenyl, y is 1 or 2;

Y$_2$ is a direct bondor no bond;

Y$_3$ is NO$_2$ or

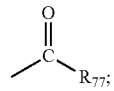

R$_{73}$ and R$_{74}$ independently of one another are hydrogen, C$_1$-C$_{20}$alkyl, C$_2$-C$_{12}$alkenyl, C$_3$-C$_8$cycloalkyl, C$_3$-C$_8$cycloalkyl which is interrupted by one or more, preferably 2, O, phenyl-C$_1$-C$_3$alkyl; or are C$_1$-C$_8$alkyl which is substituted by OH, SH, CN, C$_1$-C$_8$alkoxy, C$_1$-C$_8$alkanoyl, C$_3$-C$_8$cycloalkyl, by C$_3$-C$_8$cycloalkyl which is interrupted by one or more O, or which C$_1$-C$_8$alkyl is substituted by benzoyl which is unsubstituted or substituted by one or more C$_1$-C$_6$alkyl, halogen, OH, C$_1$-C$_4$alkoxy or by C$_1$-C$_4$alkylsulfanyl; or are phenyl or naphthyl, each of which is unsubstituted or substituted by halogen, C$_1$-C$_{12}$alkyl, C$_1$-C$_{12}$alkoxy, phenyl-C$_1$-C$_3$alkyloxy, phenoxy, C$_1$-C$_{12}$alkylsulfanyl, phenylsulfanyl, N(C$_1$-C$_{12}$alkyl)$_2$, diphenylamino or by

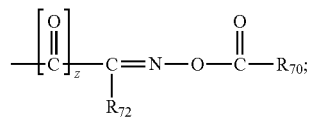

R$_{75}$ and R$_{76}$ independently of each other are hydrogen, C$_1$-C$_{20}$alkyl, C$_2$-C$_4$hydroxyalkyl, C$_2$-C$_{10}$alkoxyalkyl, C$_2$-C$_5$alkenyl, C$_3$-C$_8$cycloalkyl, phenyl-C$_1$-C$_3$alkyl, C$_1$-C$_8$alkanoyl, C$_3$-C$_{12}$alkenoyl, benzoyl; or are phenyl or naphthyl, each of which is unsubstituted or substituted by $C_1$-$C_{12}$alkyl, benzoyl or by $C_1$-$C_{12}$alkoxy; or $R_{75}$ and $R_{76}$ together are $C_2$-$C_6$alkylene optionally interrupted by O or $NR_{73}$ and optionally are substituted by hydroxyl, $C_1$-$C_4$alkoxy, $C_2$-$C_4$alkanoyloxy or by benzoyloxy;

$R_{77}$ is $C_1$-$C_{12}$alkyl, thienyl or phenyl which is unsubstituted or substituted by $C_1$-$C_{12}$alkyl, $OR_{73}$, morpholino or by N-carbazolyl.

Specific examples are 1,2-octanedione 1-[4-(phenylthio)phenyl]-2-(O-benzoyloxime), ethanone 1-[9-ethyl-6-(2-methylbenzoyl)-9H-carbazol-3-yl]-1-(O-acetyloxime), 9H-thioxanthene-2-carboxaldehyde 9-oxo-2-(O-acetyloxime), ethanone 1-[9-ethyl-6-(4morpholinobenzoyl)-9H-carbazol-3-yl]-1-(O-acetyloxime), ethanone 1-[9-ethyl-6-(2-methyl-4-(2-(1,3-dioxo-2-dimethyl-cyclopent-5-yl)ethoxy)-benzoyl)-9H-carbazol-3-yl]-1-(O-acetyloxime) (Adeka N-1919), ethanone 1-[9-ethyl-6-nitro-9H-carbazol-3-yl]-1-[2-methyl-4-(1-methyl-2-methoxy)ethoxy)phenyl]-1-(O-acetyloxime) (Adeka NCI831), etc.

It is also possible to add cationic photoinitiators, such as benzoyl peroxide (other suitable peroxides are described in U.S. Pat. No. 4,950,581, column 19, lines 17-25), or aromatic sulfonium, phosphonium or iodonium salts, such as are described, for example, in U.S. Pat. No. 4,950,581, column 18, line 60 to column 19, line 10.

Suitable sulfonium salt compounds are of formula XVa, XVb, XVc, XVd or XVe

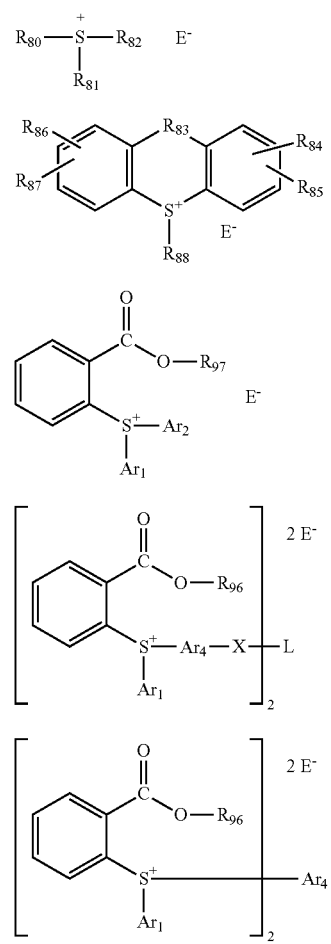

wherein $R_{80}$, $R_{81}$ and $R_{82}$ are each independently of the others unsubstituted phenyl, or phenyl substituted by —S-phenyl,

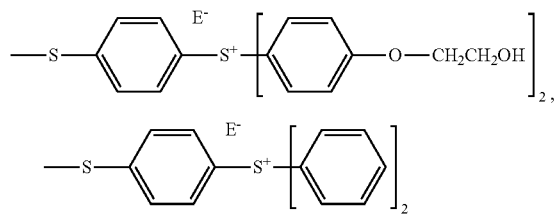

or by

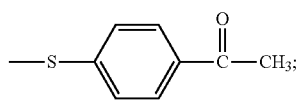

$R_{83}$ is a direct bond, S, O, $CH_2$, $(CH_2)_2$, CO or $NR_{89}$;

$R_{84}$, $R_{85}$, $R_{86}$ and $R_{87}$ independently of one another are hydrogen, $C_1$-$C_{20}$alkyl, $C_3$-$C_8$cycloalkyl, $C_1$-$C_{20}$alkoxy, $C_2$-$C_{20}$alkenyl, CN, OH, halogen, $C_1$-$C_6$alkylthio, phenyl, naphthyl, phenyl-$C_1$-$C_7$alkyl, naphthyl-$C_1$-$C_3$alkyl, phenoxy, naphthyloxy, phenyl-$C_1$-$C_7$alkyloxy, naphthyl-$C_1$-$C_3$alkyloxy, phenyl-$C_2$-$C_6$alkenyl, naphthyl-$C_2$-$C_4$alkenyl, S-phenyl, $(CO)R_{89}$, $O(CO)R_{89}$, $(CO)OR_{89}$, $SO_2R_{89}$ or $OSO_2R_{89}$;

$R_{88}$ is $C_1$-$C_{20}$alkyl, $C_1$-$C_{20}$hydroxyalkyl,

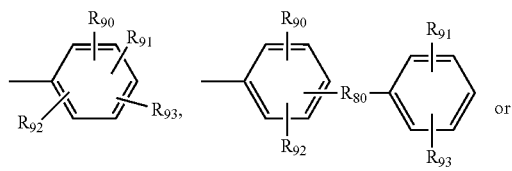

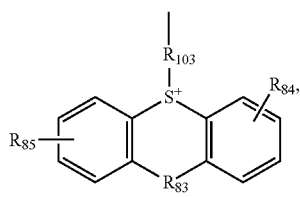

$R_{89}$ is hydrogen, $C_1$-$C_{12}$alkyl, $C_1$-$C_{12}$hydroxyalkyl, phenyl, naphthyl or biphenylyl;

$R_{90}$, $R_{91}$, $R_{92}$ and $R_{93}$ independently of one another have one of the meanings as given for $R_{84}$; or $R_{90}$ and $R_{91}$ are joined to form a fused ring system with the benzene rings to which they are attached;

$R_{95}$ is a direct bond, S, O or $CH_2$;

$R_{96}$ is hydrogen, $C_1$-$C_{20}$alkyl; $C_2$-$C_{20}$alkyl interrupted by one or more O; or is -L-M-$R_{98}$ or -L-$R_{98}$;

$R_{97}$ has one of the meanings as given for $R_{96}$ or is

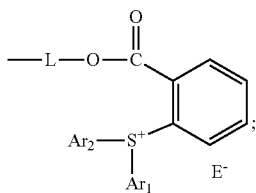

$R_{98}$ is a monovalent sensitizer or photoinitiator moiety;

$Ar_1$ and $Ar_2$ independently of one another are phenyl unsubstituted or substituted by $C_1$-$C_{20}$alkyl, halogen or $OR_{99}$;

or are unsubstituted naphthyl, anthryl, phenanthryl or biphenylyl;

or are naphthyl, anthryl, phenanthryl or biphenylyl substituted by $C_1$-$C_{20}$alkyl, OH or $OR_{99}$;

or are —$Ar_4$-$A_1$-$Ar_3$ or

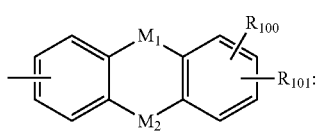

$Ar_3$ is unsubstituted phenyl, naphthyl, anthryl, phenanthryl or biphenylyl;

or is phenyl, naphthyl, anthryl, phenanthryl or biphenylyl substituted by $C_1$-$C_{20}$alkyl, $OR_{99}$ or benzoyl;

$Ar_4$ is phenylene, naphthylene, anthrylene or phenanthrylene;

$A_1$ is a direct bond, S, O or $C_1$-$C_{20}$alkylene;

X is CO, C(O)O, OC(O), O, S or $NR_{99}$;

L is a direct bond, S, O, $C_1$-$C_{20}$alkylene or $C_2$-$C_{20}$alkylene interrupted by one or more non-consecutive O;

$R_{99}$ is $C_1$-$C_{20}$alkyl or $C_1$-$C_{20}$hydroxyalkyl; or is $C_1$-$C_{20}$alkyl substituted by $O(CO)R_{102}$;

$M_1$ is S, CO or $NR_{100}$;

$M_2$ is a direct bond, $CH_2$, O or S;

$R_{100}$ and $R_{101}$ independently of one another are hydrogen, halogen, $C_1$-$C_8$alkyl, $C_1$-$C_8$alkoxy or phenyl;

$R_{102}$ is $C_1$-$C_{20}$alkyl;

$R_{103}$ is

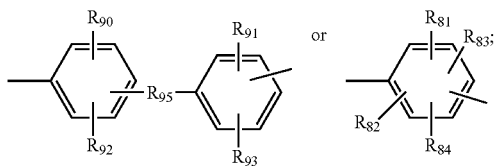

and

E is an anion, especially $PF_6$, $SbF_6$, $AsF_6$, $BF_4$, $(C_6F_5)_4B$, Cl, Br, $HSO_4$, $CF_3$—$SO_3$, F—$SO_3$,

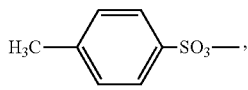

$CH_3$—$SO_3$, $ClO_4$, $PO_4$, $NO_3$, $SO_4$, $CH_3$—$SO_4$, or

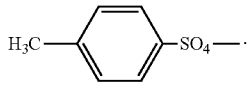

Specific examples of sulfonium salt compounds are for example Irgacure® 270 (BASF SE); Cyracure® UVI-6990, Cyracure® UVI-6974 (DOW), Degacure® KI 85 (Degussa), SP-55, SP-150, SP-170 (Asahi Denka), GE UVE 1014 (General Electric), SarCat® KI-85 (=triarylsulfonium hexafluorophosphate; Sartomer), SarCat® CD 1010 (=mixed triarylsulfonium hexafluoroantimonate; Sartomer); SarCat® CD 1011(=mixed triarylsulfonium hexafluorophosphate; Sartomer).

Suitable iodonium salt compounds are of formula XVI

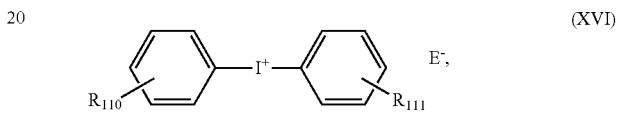

(XVI)

wherein $R_{110}$ and $R_{111}$ are each independently of the other hydrogen, $C_1$-$C_{20}$alkyl, $C_1$-$C_{20}$alkoxy, OH-substituted $C_1$-$C_{20}$alkoxy, halogen, $C_2$-$C_{12}$alkenyl, $C_3$-$C_8$cycloalkyl, especially methyl, isopropyl or isobutyl; and E is an anion, especially $PF_6$, $SbF_6$, $AsF_6$, $BF_4$, $(C_6F_5)_4B$, Cl, Br, $HSO_4$, $CF_3$—$SO_3$, F—$SO_3$,

$CH_3$—$SO_3$, $ClO_4$, $PO_4$, $NO_3$, $SO_4$, $CH_3$—$SO_4$ or

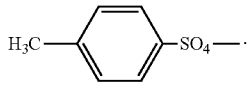

Specific examples of iodonium salt compounds are e.g. tolylcumyliodonium tetrakis(pentafluorophenyl)borate, 4-[(2-hydroxy-tetradecyloxy)phenyl]phenyliodonium hexafluoroantimonate or hexafluorophosphate, tolylcumyliodonium hexafluorophosphate, 4-isopropylphenyl-4'-methylphenyliodonium hexafluorophosphate, 4-isobutylphenyl-4'-methylphenyliodonium hexafluorophosphate, 4-octyloxyphenyl-phenyliodonium hexafluorophosphate or hexafluoroantimonate, bis(dodecylphenyl)iodonium hexafluoroantimonate or hexafluorophosphate, bis(4-methylphenyl)iodonium hexafluorophosphate, bis(4-methoxyphenyl)iodonium hexafluorophosphate, 4-methylphenyl-4'-ethoxyphenyliodonium hexafluorophosphate, 4-methylphenyl-4'-dodecylphenyliodonium hexafluorophosphate, 4-methylphenyl-4'-phenoxyphenyliodonium hexafluorophosphate. Of all the iodonium salts mentioned, compounds with other anions are, of course, also suitable. The preparation of iodonium salts is known to the person skilled in the art and described in the literature, for example U.S. Pat. Nos. 4,151,175, 3,862,333, 4,694,029, EP 562897, U.S. Pat. Nos. 4,399,071, 6,306,555, WO 98/46647

J. V. Crivello, "Photoinitiated Cationic Polymerization" in: UV Curing: Science and Technology, Editor S. P. Pappas, pages 24-77, Technology Marketing Corporation, Norwalk, Conn. 1980, ISBN No. 0-686-23773-0; J. V. Crivello, J. H. W. Lam, Macromolecules, 10, 1307 (1977) and J. V. Crivello, Ann. Rev. Mater. Sci. 1983, 13, pages 173-190 and J. V. Crivello, Journal of Polymer Science, Part A: Polymer Chemistry, Vol. 37, 4241-4254 (1999).

In certain cases it may be of advantage to use mixtures of two or more photoinitiators.

Halogen is fluorine, chlorine, bromine and iodine.

$C_1$-$C_{24}$alkyl ($C_1$-$C_{20}$alkyl, especially $C_1$-$C_{12}$alkyl) is typically linear or branched, where possible. Examples are methyl, ethyl, n-propyl, isopropyl, n-butyl, sec.-butyl, isobutyl, tert.-butyl, n-pentyl, 2-pentyl, 3-pentyl, 2,2-dimethylpropyl, 1,1,3,3-tetramethylpentyl, n-hexyl, 1-methylhexyl, 1,1,3,3,5,5-hexamethylhexyl, n-heptyl, isoheptyl, 1,1,3,3-tetramethylbutyl, 1-methylheptyl, 3-methylheptyl, n-octyl, 1,1,3,3-tetramethylbutyl and 2-ethylhexyl, n-nonyl, decyl, undecyl, dodecyl, tridecyl, tetradecyl, pentadecyl, hexadecyl, heptadecyl, or octadecyl. $C_1$-$C_8$alkyl is typically methyl, ethyl, n-propyl, isopropyl, n-butyl, sec.-butyl, isobutyl, tert.-butyl, n-pentyl, 2-pentyl, 3-pentyl, 2,2-dimethyl-propyl, n-hexyl, n-heptyl, n-octyl, 1,1,3,3-tetramethylbutyl and 2-ethylhexyl. $C_1$-$C_4$alkyl is typically methyl, ethyl, n-propyl, isopropyl, n-butyl, sec.-butyl, isobutyl, tert.-butyl.

$C_2$-$C_{12}$alkenyl ($C_2$-$C_5$alkenyl) groups are straight-chain or branched alkenyl groups, such as e.g. vinyl, allyl, methallyl, isopropenyl, 2-butenyl, 3-butenyl, isobutenyl, n-penta-2,4-dienyl, 3-methyl-but-2-enyl, n-oct-2-enyl, or n-dodec-2-enyl.

$C_1$-$C_{12}$alkoxy groups ($C_1$-$C_8$alkoxy groups) are straight-chain or branched alkoxy groups, e.g. methoxy, ethoxy, n-propoxy, isopropoxy, n-butoxy, sec-butoxy, tert-butoxy, amyloxy, isoamyloxy or tert-amyloxy, heptyloxy, octyloxy, isooctyloxy, nonyloxy, decyloxy, undecyloxy and dodecyloxy.

$C_1$-$C_{12}$alkylthio groups ($C_1$-$C_8$ alkylthio groups) are straight-chain or branched alkylthio groups and have the same preferences as the akoxy groups, except that oxygen is exchanged against sulfur.

$C_1$-$C_{12}$alkylene is bivalent $C_1$-$C_{12}$alkyl, i.e. alkyl having two (instead of one) free valencies, e.g. trimethylene or tetramethylene.

A cycloalkyl group is typically $C_3$-$C_8$cycloalkyl, such as, for example, cyclopentyl, cyclohexyl, cycloheptyl, or cyclooctyl, which may be unsubstituted or substituted.

In several cases it is advantageous to in addition to the photoinitiator employ a sensitizer compound. Examples of suitable sensitizer compounds are disclosed in WO 06/008251, page 36, line 30 to page 38, line 8, the disclosure of which is hereby incorporated by reference. As sensitizer inter alia benzophenone compounds as described above can be employed.

The unsaturated compounds may include one or more olefinic double bonds. They may be of low (monomeric) or high (oligomeric) molecular mass. Examples of monomers containing a double bond are alkyl, hydroxyalkyl or amino acrylates, or alkyl, hydroxyalkyl or amino methacrylates, for example methyl, ethyl, butyl, 2-ethylhexyl or 2-hydroxyethyl acrylate, isobornyl acrylate, methyl methacrylate or ethyl methacrylate. Silicone acrylates are also advantageous. Other examples are acrylonitrile, acrylamide, methacrylamide, N-substituted (meth)acrylamides, vinyl esters such as vinyl acetate, vinyl ethers such as isobutyl vinyl ether, styrene, alkyl- and halostyrenes, N-vinylpyrrolidone, vinyl chloride or vinylidene chloride.

Examples of monomers containing two or more double bonds are the diacrylates of ethylene glycol, propylene glycol, neopentyl glycol, hexamethylene glycol or of bisphenol A, and 4,4'-bis(2-acryl-oyloxyethoxy)diphenylpropane, trimethylolpropane triacrylate, pentaerythritol triacrylate or tetraacrylate, vinyl acrylate, divinylbenzene, divinyl succinate, diallyl phthalate, triallyl phosphate, triallyl isocyanurate or tris(2-acryloylethyl) isocyanurate.

Examples of polyunsaturated compounds of relatively high molecular mass (oligomers) are acrylated epoxy resins, polyesters containing acrylate-, vinyl ether- or epoxy-groups, and also polyurethanes and polyethers. Further examples of unsaturated oligomers are unsaturated polyester resins, which are usually prepared from maleic acid, phthalic acid and one or more diols and have molecular weights of from about 500 to 3000. In addition it is also possible to employ vinyl ether monomers and oligomers, and also maleate-terminated oligomers with polyester, polyurethane, polyether, polyvinyl ether and epoxy main chains. Of particular suitability are combinations of oligomers which carry vinyl ether groups and of polymers as described in WO90/01512. However, copolymers of vinyl ether and maleic acid-functionalized monomers are also suitable. Unsaturated oligomers of this kind can also be referred to as prepolymers.

Particularly suitable examples are esters of ethylenically unsaturated carboxylic acids and polyols or polyepoxides, and polymers having ethylenically unsaturated groups in the chain or in side groups, for example unsaturated polyesters, polyamides and polyurethanes and copolymers thereof, polymers and copolymers containing (meth)acrylic groups in side chains, and also mixtures of one or more such polymers.

Examples of unsaturated carboxylic acids are acrylic acid, methacrylic acid, crotonic acid, itaconic acid, cinnamic acid, and unsaturated fatty acids such as linolenic acid or oleic acid. Acrylic and methacrylic acid are preferred.

Suitable polyols are aromatic and, in particular, aliphatic and cycloaliphatic polyols. Examples of aromatic polyols are hydroquinone, 4,4'-dihydroxydiphenyl, 2,2-di(4-hydroxyphenyl)propane, and also novolaks and resols. Examples of polyepoxides are those based on the abovementioned polyols, especially the aromatic polyols, and epichlorohydrin. Other suitable polyols are polymers and copolymers containing hydroxyl groups in the polymer chain or in side groups, examples being polyvinyl alcohol and copolymers thereof or polyhydroxyalkyl methacrylates or copolymers thereof. Further polyols which are suitable are oligoesters having hydroxyl end groups.

Examples of aliphatic and cycloaliphatic polyols are alkylenediols having preferably 2 to 12 C atoms, such as ethylene glycol, 1,2- or 1,3-propanediol, 1,2-, 1,3- or 1,4-butanediol, pentanediol, hexanediol, octanediol, dodecanediol, diethylene glycol, triethylene glcyol, polyethylene glycols having molecular weights of preferably from 200 to 1500, 1,3-cyclopentanediol, 1,2-, 1,3- or 1,4-cyclohexanediol, 1,4-dihydroxymethylcyclohexane, glycerol, tris(β-hydroxyethyl)amine, trimethylolethane, trimethylolpropane, pentaerythritol, dipentaerythritol and sorbitol.

The polyols may be partially or completely esterified with one carboxylic acid or with different unsaturated carboxylic acids, and in partial esters the free hydroxyl groups may be modified, for example etherified or esterified with other carboxylic acids.

Examples of esters are: trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, tripropylene glycol diacrylate (TPGDA), dipropylene glycol diacrylate (DPGDA), pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol tris-itaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetra methacrylate, sorbitol pentaacrylate, sorbitol hexaacrylate, oligoester acrylates and methacrylates, glycerol diacrylate and triacrylate, 1,4-cyclohexane diacrylate, bisacrylates and bismethacrylates of polyethylene glycol with a molecular weight of from 200 to 1500, or mixtures thereof. Also suitable as polymerizable components are triacrylate of singly to viginituply alkoxylated, more preferably singly to viginituply ethoxylated trimethylolpropane, singly to viginituply propoxylated glycerol or singly to viginituply ethoxylated and/or propoxylated pentaerythritol, such as, for example, ethoxylated trimethylol propane triacrylate (TMEOPTA).

Also suitable as polymerizable components are the amides of identical or different, unsaturated carboxylic acids with aromatic, cycloaliphatic and aliphatic polyamines having preferably 2 to 6, especially 2 to 4, amino groups. Examples of such polyamines are ethylenediamine, 1,2- or 1,3-propylenediamine, 1,2-, 1,3- or 1,4-butylenediamine, 1,5-pentylenediamine, 1,6-hexylenediamine, octylenediamine, dodecylenediamine, 1,4-diaminocyclohexane, isophoronediamine, phenylenediamine, bisphenylenediamine, di-β-aminoethyl ether, diethylenetriamine, triethylenetetramine, di(β-aminoethoxy)- or di(β-aminopropoxy)ethane. Other suitable polyamines are polymers and copolymers, preferably with additional amino groups in the side chain, and oligoamides having amino end groups. Examples of such unsaturated amides are methylenebisacrylamide, 1,6-hexamethylenebisacrylamide, diethylenetriaminetrismethacrylamide, bis(methacrylamidopropoxy)ethane, β-methacrylamidoethyl methacrylate and N[(β-hydroxy-ethoxy)ethyl]acrylamide.

Suitable unsaturated polyesters and polyamides are derived, for example, from maleic acid and from diols or diamines. Some of the maleic acid can be replaced by other dicarboxylic acids. They can be used together with ethylenically unsaturated comonomers, for example styrene. The polyesters and polyamides may also be derived from dicarboxylic acids and from ethylenically unsaturated diols or diamines, especially from those with relatively long chains of, for example 6 to 20 C atoms. Examples of polyurethanes are those composed of saturated or unsaturated diisocyanates and of unsaturated or, respectively, saturated diols.

Polymers with (meth)acrylate groups in the side chain are likewise known. They may, for example, be reaction products of epoxy resins based on novolaks with (meth)acrylic acid, or may be homo- or copolymers of vinyl alcohol or hydroxyalkyl derivatives thereof which are esterified with (meth)acrylic acid, or may be homo- and copolymers of (meth)acrylates which are esterified with hydroxyalkyl (meth)acrylates.

Other suitable polymers with acrylate or methacrylate groups in the side chains are, for example, solvent soluble or alkaline soluble polyimide precursors, for example poly (amic acid ester) compounds, having the photopolymerizable side groups either attached to the backbone or to the ester groups in the molecule, i.e. according to EP624826. Such oligomers or polymers can be formulated with optionally reactive diluents, like polyfunctional (meth)acrylates in order to prepare highly sensitive polyimide precursor resists.

Examples of polymerizable components are also polymers or oligomers having at least two ethylenically unsaturated groups and at least one carboxyl function within the molecule structure, such as a resin obtained by the reaction of a saturated or unsaturated polybasic acid anhy-dride with a product of the reaction of an epoxy compound and an unsaturated monocarboxylic acid, for example, photosensitive compounds as described in JP 10-301276 and commercial products such as for example EB9696, UCB Chemicals; KAYARAD TCR1025, Nippon Kayaku Co., LTD., NK OLIGO EA-6340, EA-7440 from Shin-Nakamura Chemical Co., Ltd., or an addition product formed between a carboxyl group-containing resin and an unsaturated compound having an α,β-unsaturated double bond and an epoxy group (for example, ACA200M, Daicel Industries, Ltd.). Additional commercial products as examples of polymerizable component are ACA200, ACA210P, ACA230AA, ACA250, ACA300, ACA320 from Daicel Chemical Industries, Ltd.

The polymerizable compound, may also comprise urethane (meth)acrylates, epoxy (meth)acrylates or carbonate (meth)acrylates.

Urethane (meth)acrylates are obtainable for example by reacting polyisocyanates with hydroxyalkyl (meth)acrylates and optionally chain extenders such as diols, polyols, diamines, polyamines, dithiols or polythiols.

The urethane (meth)acrylates preferably have a number-average molar weight $M_n$ of 500 to 20 000, in particular of 500 to 10 000 and more preferably 600 to 3000 g/mol (determined by gel permeation chromatography using tetrahydrofuran and polystyrene as standard).

The urethane (meth)acrylates preferably have a (meth) acrylic group content of 1 to 5, more preferably of 2 to 4, mol per 1000 g of urethane (meth)acrylate.

Epoxy (meth)acrylates are obtainable by reacting epoxides with (meth)acrylic acid. Examples of suitable epoxides include epoxidized olefins, aromatic glycidyl ethers or aliphatic glycidyl ethers, preferably those of aromatic or aliphatic glycidyl ethers.

Examples of possible epoxidized olefins include ethylene oxide, propylene oxide, isobutylene oxide, 1-butene oxide, 2-butene oxide, vinyloxirane, styrene oxide or epichlorohydrin, preference being given to ethylene oxide, propylene oxide, isobutylene oxide, vinyloxirane, styrene oxide or epichlorohydrin, particular preference to ethylene oxide, propylene oxide or epichlorohydrin, and very particular preference to ethylene oxide and epichlorohydrin.

Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxypropoxy)phenyl]octahydro-4,7-methano-5H-indene (CAS No. [13446-85-0]), tris[4-(2,3-epoxypropoxy)phenyl]methane isomers (CAS No.

[66072-39-7]), phenol-based epoxy novolaks (CAS No. [9003-35-4]), and cresol-based epoxy novolaks (CAS No. [37382-79-9]).

Examples of aliphatic glycidyl ethers include 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl]ethane (CAS No. [27043-37-4]), diglycidyl ether of polypropylene glycol (α,ω-bis(2,3-epoxypropoxy)poly(oxypropylene), CAS No. [16096-30-3]) and of hydrogenated bisphenol A (2,2-bis[4-(2,3-epoxypropoxy)cyclohexyl]propane, CAS No. [13410-58-7]).

The epoxy (meth)acrylates preferably have a number-average molar weight $M_n$ of 200 to 20 000, more preferably of 200 to 10 000 g/mol, and very preferably of 250 to 3000 g/mol; the amount of (meth)acrylic groups is preferably 1 to 5, more preferably 2 to 4, per 1000 g of epoxy (meth)acrylate (determined by gel permeation chromatography using polystyrene as standard and tetrahydrofuran as eluent).

Carbonate (meth)acrylates comprise on average preferably 1 to 5, especially 2 to 4, more preferably 2 to 3 (meth)acrylic groups, and very preferably 2 (meth)acrylic groups.

The number-average molecular weight $M_n$ of the carbonate (meth)acrylates is preferably less than 3000 g/mol, more preferably less than 1500 g/mol, very preferably less than 800 g/mol (determined by gel permeation chromatography using polystyrene as standard, tetrahydrofuran as solvent).

The carbonate (meth)acrylates are obtainable in a simple manner by transesterifying carbonic esters with polyhydric, preferably dihydric, alcohols (diols, hexanediol for example) and subsequently esterifying the free OH groups with (meth)acrylic acid, or else by transesterification with (meth)acrylic esters, as described for example in EP-A 92 269. They are also obtainable by reacting phosgene, urea derivatives with polyhydric, e.g., dihydric, alcohols.

Also conceivable are (meth)acrylates of polycarbonate polyols, such as the reaction product of one of the aforementioned diols or polyols and a carbonic ester and also a hydroxyl-containing (meth)acrylate.

Examples of suitable carbonic esters include ethylene carbonate, 1,2- or 1,3-propylene carbonate, dimethyl carbonate, diethyl carbonate or dibutyl carbonate.

Examples of suitable hydroxyl-containing (meth)acrylates are 2-hydroxyethyl (meth)acrylate, 2- or 3-hydroxypropyl (meth)acrylate, 1,4-butanediol mono(meth)acrylate, neopentyl glycol mono(meth)acrylate, glyceryl mono- and di(meth)acrylate, trimethylolpropane mono- and di(meth)acrylate, and pentaerythritol mono-, di-, and tri(meth)acrylate.

Particularly preferred carbonate (meth)acrylates are those of the formula:

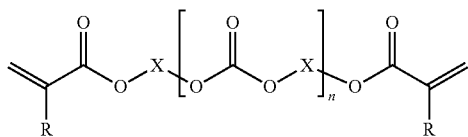

in which R is H or $CH_3$, X is a $C_2$-$C_{18}$ alkylene group, and n is an integer from 1 to 5, preferably 1 to 3.

R is preferably H and X is preferably $C_2$ to $C_{10}$ alkylene, examples being 1,2-ethylene, 1,2-propylene, 1,3-propylene, 1,4-butylene, and 1,6-hexylene, more preferably $C_4$ to $C_8$ alkylene. With very particular preference X is $C_6$ alkylene.

The carbonate (meth)acrylates are preferably aliphatic carbonate (meth)acrylates.

As diluent, a mono- or multi-functional ethylenically unsaturated compound, or mixtures of several of said compounds, can be included in the above composition up to 70% by weight based on the solid portion of the composition.

The invention also provides compositions comprising as polymerizable component at least one ethylenically unsaturated photopolymerizable compound which is emulsified or dissolved in water, or organic solvents.

The UV curable composition for deposition of the second layer according to the present invention comprises
  (a) 0.02 to 20.0, especially 0.02 to 15.0, very especially 0.05 to 10.0% by weight of photoinitiator,
  (b) 99.0 to 1.0, especially 99.0 to 2.0, very especially 97.0 to 3.0% by weight of a binder (unsaturated compound(s) including one or more olefinic double bonds),
  (c) optionally 0 to 98.9, especially 0 to 97.9, very especially 0 to 96.9% by weight of solvent wherein the sum of components a) and b) and c) adds up to 100%.

In a preferred embodiment the UV curable composition comprises an epoxy-acrylate (10 to 60%) and one or several (monofunctional and multifunctional) acrylates (20 to 90%) and one, or several photoinitiators (1 to 15%).

The epoxy-acrylate is selected from aromatic glycidyl ethers aliphatic glycidyl ethers. Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxypropoxy)phenyl]octahydro-4,7-methano-5H-indene (CAS No. [13446-85-0]), tris[4-(2,3-epoxypropoxy)phenyl]methane isomers (CAS No. [66072-39-7]), phenol-based epoxy novolaks (CAS No. [9003-35-4]), and cresol-based epoxy novolaks (CAS No. [37382-79-9]). Examples of aliphatic glycidyl ethers include 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl]ethane (CAS No. [27043-37-4]), diglycidyl ether of polypropylene glycol (α,ω-bis(2,3-epoxypropoxy)poly(oxypropylene), CAS No. [16096-30-3]) and of hydrogenated bisphenol A (2,2-bis[4-(2,3-epoxypropoxy)cyclohexyl]propane, CAS No. [13410-58-7]).

The one or several acrylates are preferably multifunctional monomers which are selected from trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, tripropylene glycol diacrylate (TPGDA), dipropylene glycol diacrylate (DPGDA), pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol tris-itaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetra methacrylate, sorbitol pentaacrylate, sorbitol hexaacrylate, oligoester acrylates and methacrylates, glycerol diacrylate and triacrylate, 1,4-cyclohexane diacrylate, bisacrylates and bismethacrylates of polyethylene glycol with a molecular weight of from 200 to 1500, triacrylate of singly to vigintuply alkoxylated, more preferably singly to vigintuply ethoxylated trimethylolpropane, singly to vigintuply propoxylated glycerol or singly to vigintuply ethoxylated and/or propoxylated pentaerythritol, such as, for example, ethoxylated trimethylol propane triacrylate (TMEOPTA) and or mixtures thereof.

In another preferred embodiment the UV curable composition comprises:

| | |
|---|---|
| Bisphenol A epoxyacrylate with 25% TPGDA | 1-35% by weight |
| Dipropylene glycol diacrylate (DPGDA) | 30-45% by weight |
| Ethoxylated trimethylol propane triacrylate (TMEOPTA) | 10-50% by weight |
| Reactive tertiary amine | 1-15% by weight |
| Photoinitiator: | 5-10% by weight |

The amounts of the components of-the of UV curable composition add up to 100% by weight.

In another preferred embodiment the UV curable composition comprises:

| | |
|---|---|
| Tripropylene glycol diacrylate (TPGDA) | 1-25% by weight |
| Dipropylene glycol diacrylate (DPGDA) | 30-45% by weight |
| Ethoxylated trimethylol propane triacrylate (TMEOPTA) | 10-50% by weight |
| Reactive tertiary amine | 1-15% by weight |
| Photoinitiator: | 5-9% by weight |

The amounts of the components of-the of UV curable composition add up to 100% by weight.

The photoinitiator is preferably a blend of an alpha-hydroxy ketone, alpha-alkoxyketone or alpha-aminoketone compound of the formula (XI) and a benzophenone compound of the formula (X); or a blend of an alpha-hydroxy ketone, alpha-alkoxyketone or alpha-aminoketone compound of the formula (XI), a benzophenone compound of the formula (X) and an acylphosphine oxide compound of the formula (XII).

The curable composition may comprise various additives. Examples thereof include thermal inhibitors, coinitiators and/or sensitisers, light stabilisers, optical brighteners, fillers and pigments, as well as white and coloured pigments, dyes, antistatics, wetting agents, flow auxiliaries, lubricants, waxes, anti-adhesive agents, dispersants, emulsifiers, antioxidants; fillers, e.g. talcum, gypsum, silicic acid, rutile, carbon black, zinc oxide, iron oxides; reaction accelerators, thickeners, matting agents, antifoams, leveling agents and other adjuvants customary, for example, in lacquer, ink and coating technology.

Examples of coinitiators/sensitisers are especially aromatic carbonyl compounds, for example benzophenone, thioxanthone, especially isopropyl thioxanthone, anthraquinone and 3-acylcoumarin derivatives, terphenyls, styryl ketones, and also 3-(aroylmethylene)-thiazolines, camphor quinone, and also eosine, rhodamine and erythrosine dyes. Amines, for example, can also be regarded as photosensitisers when the photoinitiator consists of a benzophenone or benzophenone derivative.

Examples of light stabilizers are:

Phosphites and phosphonites (processing stabilizer), for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2"-nitrilo[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane, phosphorous acid, mixed 2,4-bis(1,1-dimethylpropyl)phenyl and 4-(1,1-dimethylpropyl)phenyl triesters (CAS No. 939402-02-5), Phosphorous acid, triphenyl ester, polymer with alpha-hydro-omega-hydroxypoly[oxy(methyl-1,2-ethanediyl)], C10-16 alkyl esters (CAS No. 1227937-46-3). The following phosphites are especially preferred: Tris(2,4-di-tert-butylphenyl) phosphite, tris(nonylphenyl) phosphite,

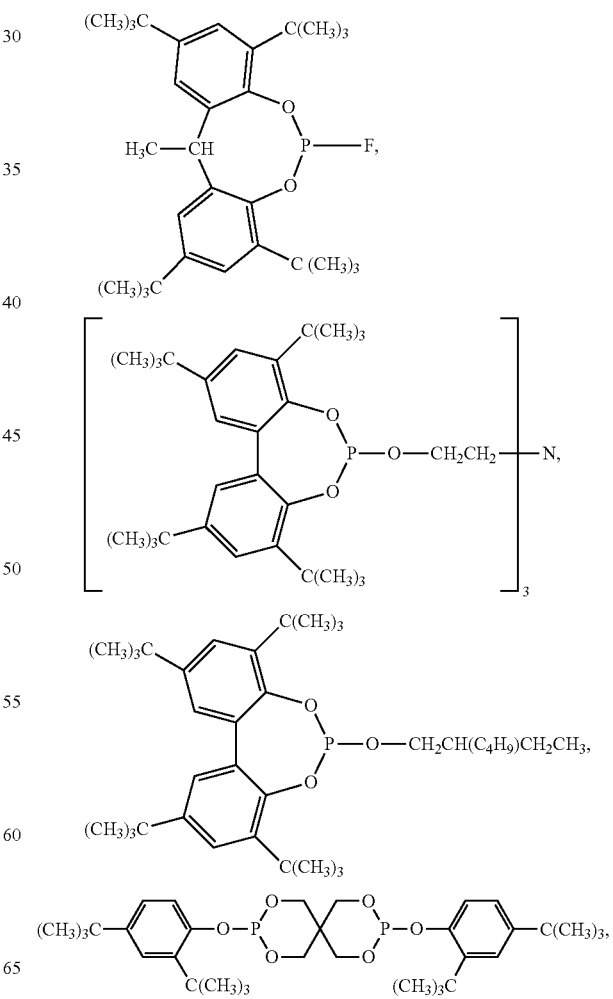

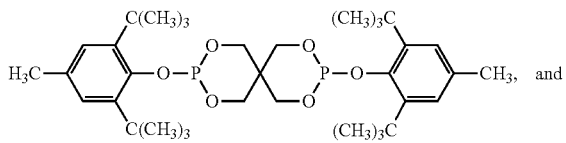

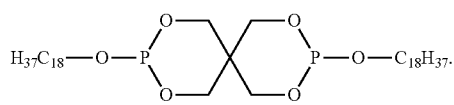

Quinone methides of the formula

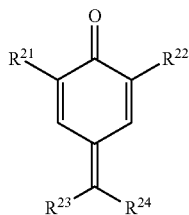

(providing long term shelf life stability), wherein $R^{21}$ and $R^{22}$ independently of each other are $C_1$-$C_{18}$alkyl, $C_5$-$C_{12}$cycloalkyl, $C_7$-$C_{15}$-phenylalkyl, optionally substituted $C_6$-$C_{10}$aryl;

$R^{23}$ and $R^{24}$ independently of each other are H, optionally substituted $C_6$-$C_{10}$-aryl, 2-,3-,4-pyridyl, 2-,3-furyl or thienyl, COOH, COOR$^{25}$, CONH$_2$, CONHR$^{25}$, CONR$^{25}$R$^{26}$, —CN, —COR$^{25}$, —OCOR$^{25}$, —OPO(OR$^{25}$)$_2$, wherein $R^{25}$ and $R^{26}$ are independently of each other $C_1$-$C_8$alkyl, or phenyl. Quinone methides are preferred, wherein $R^{21}$ and $R^{22}$ are tert-butyl;

$R^{23}$ is H, and $R^{24}$ is optionally substituted phenyl, COOH, COOR$^{25}$, CONH$_2$, CONHR$^{25}$, CONR$^{25}$R$^{26}$, —CN, —COR$^{25}$, —OCOR$^{25}$, —OPO(OR$^{25}$)$_2$, wherein $R^{25}$ and $R^{26}$ are $C_1$-$C_8$alkyl, or phenyl. Examples of quinone methides are

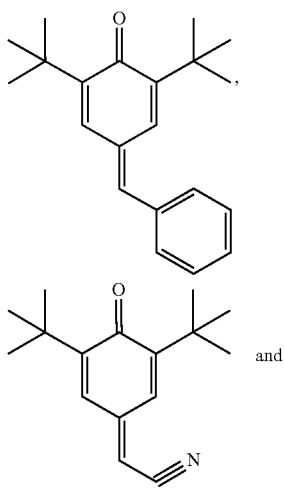

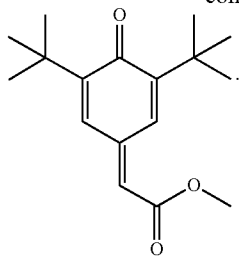

The quinone methides may be used in combination with highly sterically hindered nitroxyl radicals as described, for example, in US20110319535.

The quinone methides are used typically in a proportion of from about 0.01 to 0.3% by weight, preferably from about 0.04 to 0.15% by weight, based on the total weight of the UV curable composition.

Leveling agents used, which additionally also serve to improve scratch resistance, can be the products TEGO® Rad 2100, TEGO® Rad 2200, TEGO® Rad 2300, TEGO® Rad 2500, TEGO® Rad 2600, TEGO® Rad 2700 and TEGO® Twin 4000, likewise obtainable from Tego. Such auxiliaries are obtainable from BYK, for example as BYK®-300, BYK®-306, BYK®-307, BYK®-310, BYK®-320, BYK®-322, BYK®-331, BYK®-333, BYK®-337, BYK®-341, Byk® 354, Byk® 361 N, BYK®-378 and BYK®-388.

Leveling agents are typically used in a proportion of from about 0.005 to 1.0% by weight, preferably from about 0.01 to 0.2% by weight, based on the total weight of the UV curable composition.

In addition, the organic material may comprise inorganic nanoparticles, such as, for example, $SiO_2$, $TiO_2$, $ZrO_2$ and $CeO_2$.

In a preferred embodiment the security or decorative element comprises on at least part of the substrate surface the first layer, comprising the transition metal particles, and on part of the first layer the second layer in a defined shape, such as, for example, a symbol, a stripe, a geometrical shape, a design, lettering, an alphanumeric character, the representation of an object or parts thereof.

The security or decorative element may comprise one, or more further layers, which are selected from black layers, white layers, metallic layers, plasmonic layers, embossed layers with diffractive gratings, micromirrors, lenses, magnetic layers, fluorescent layers, interference layers, colored layers, IR-absorbing layers, IR-transparent layers and conductive layers.

The layers might be fully, or partially printed on the security element.

In addition, the present invention relates to a product, i.e. security document, comprising the security element according to the present invention as a laminate onto the document or embedded as a (windowed) thread into the document or as a window on the document, and to the use of the security element of the present invention for the prevention of counterfeit or reproduction, on a document of value, right, identity, a security label or a branded good.

The security document may be a banknote, tax stamp, ID-card, voucher, entrance ticket, or label.

In addition, the product includes credit cards, identification documents, or other verification documents, pharmaceutical apparel, software, compact discs, tobacco packaging and other products or packaging prone to counterfeiting or forgery.

The method of producing the security or decorative element according to the present invention comprises the steps of
- a) providing a substrate having a surface, which surface may contain indicia or other visible features;
- b) applying, on top of at least part of the said substrate surface a first layer, comprising transition metal particles having an average diameter of from 5 nm to 500 nm and a binder,
- c) applying on at least part of the said first layer a second layer, comprising an organic material and having a refractive index of from 1.2 to 2.3, especially 1.2 to 2.0, very especially 1.3 to 1.7, and a thickness of from 20 to 1000 nm, especially 30 to 700 nm, very especially 30 to 600 nm, wherein the transition metal is silver, copper, gold and palladium, especially silver and copper, very especially silver, wherein the weight ratio of transition metal particles to binder in the first layer is in the range from 20:1 to 1:2 in case the binder is a polymeric binder, or wherein the weight ratio of transition metal particles to binder in the first layer is in the range from 5:1 to 1:15 in case the binder is an UV curable binder.

The application of the first and the second layer is preferably done by gravure, offset flexographic, ink jet and screen printing.

The security (or decorative) element of the invention can be affixed to a variety of objects through various attachment mechanisms, such as pressure sensitive adhesives or hot stamping processes, to provide for enhanced security measures such as anticounterfeiting. The security article can be utilized in the form of a label, a tag, a ribbon, a security thread, and the like, for application to a variety of objects such as security documents, monetary currency, credit cards, merchandise, etc.

Accordingly, the present invention is also directed to a product, comprising the security element according to the present invention, and to the use of the security element according to the present invention for the prevention of counterfeit or reproduction, on a document of value, right, identity, a security label or a branded good.

Various aspects and features of the present invention will be further discussed in terms of the examples. The following examples are intended to illustrate various aspects and features of the present invention.

The following examples illustrate the invention without restricting it.

EXAMPLES

TEM analysis of dispersions and coatings was performed on EM 910 instrument from ZEISS in bright field mode at an e-beam acceleration voltage of 100 kV. At least 2 representative images with scale in different magnification were recorded in order to characterize the dominant particle morphology for each sample.

The "average diameter" is the number mean diameter of the particles which was determined from TEM images as maximum dimension of nanoplatelets, oriented parallel to the plane of the image, using Fiji image analysis software, based on the measurement of at least 100 randomly selected particles.

The "average thickness" is the number mean thickness of the particles which was measured manually as the maximum dimension of nanoplatelets, oriented perpendicular to the plane of the image, from a TEM image, based on the measurement of at least 20 randomly selected particles.

Example 1

Ag nanoplatelets (having an average thickness of about 18 nm and an average diameter of about 45 nm (dispersion 1 g, 40% dry content w/w) in 1-methoxy-2-propanol is added to a solution of nitrocellulose in 1-methoxy-2-propanol (4 g, 5% dry content w/w) and vigorously mixed. The resulting composition is applied onto PET foil (Melinex 506) by means of wired hand-coater #1 and the coating is dried. The resulting coating shows magenta color in transmission and greenish-metallic color in reflection when observed from coating side and from PET substrate side.

This coating is overcoated with the solution of poly(vinyl alcohol) (Mw 13,000-23,000, 87-89% hydrolyzed) in water (3, 5, or 7% w/w concentration) by means of wired hand-coater #1 or #2.

The obtained 2-layer security or decorative elements exhibit intensive angle-dependent colors in reflection on the coating side and an angle-independent greenish-metallic color in reflection when observed from the PET substrate side. The transmission color of the security or decorative elements with and without overcoating is essentially the same; i.e. differs by not more than 5 $\Delta E^*_{ab}$ units. All the samples were visually assessed for the color flop upon tilting.

The thickness of the poly(vinyl alcohol) layer is determined as described below.

A small part (~5 mm×10 mm) of the coated PET foils is sputter-coated with a gold layer (~80 nm) for protection. Cross-sections were prepared by an Ultra-Microtome. The PET foils with the prepared cross-section area are fixed on aluminum holders by means of a carbon adhesive. The prepared sample cross-sections are analyzed using scanning electron microscope and image analysis software. The thickness of the poly(vinyl alcohol) layer between silver nanoparticle film and gold layer is measured on 6 different positions for each cross-section using image analysis software. The determined mean poly(vinyl alcohol) film thickness values are listed in Table 1 together with the standard deviation and corresponding color flops.

TABLE 1

Measured thicknesses of poly(vinyl alcohol) layer and corresponding color flops

| Sample name | Poly(vinyl alcohol) solution concentration, % w/w | Wired rackle hand-coater | Measured mean thickness of poly(vinyl alcohol) layer ± standard deviation, nm | Color flop (normal incidence to 60° from normal) |
|---|---|---|---|---|
| A | 3 | 1 | 83 ± 11 | Blue to magenta |
| B | 3 | 2 | 124 ± 16 | Magenta to yellow |
| C | 5 | 1 | 133 ± 17 | Yellow to blueish-green |
| D | 5 | 2 | 282 ± 19 | Magenta to green |
| E | 7 | 1 | 192 ± 30 | Blue to magenta |
| F | 7 | 2 | 495 ± 33 | Magenta to green |

The synthesis of the silver nanoplatelets used in Example 1 is described in Example 1 of PCT/EP2019/078469.

The invention claimed is:

1. A security, or decorative element, consisting of a transparent, or translucent substrate, and on at least part of the substrate surface, a first layer, comprising transition metal particles having an average diameter of from 5 nm to 500 nm and a binder, on at least part of the first layer a second layer, comprising an organic material and having a refractive index of from 1.2 to 2.3, and having a thickness of from 20 to 1000 nm, wherein the transition metal is selected from the group consisting of silver, copper, gold and palladium, wherein the weight ratio of transition metal particles to binder in the first layer is in the range from 20:1 to 1:2 in case the binder is a polymeric binder, or wherein the weight ratio of transition metal particles to binder in the first layer is in the range from 5:1 to 1:15 in case the binder is an UV curable binder, wherein the security or decorative element, consisting of the substrate, the first and the second layer, exhibits on its coated side an intensive angle dependent color in reflection and the transmission color of the security or decorative element with and without the second layer is essentially the same and differs by not more than 5 $\Delta E^*ab$ units.

2. The security element, or decorative element according to claim 1, wherein the transition metal particles are in the form of nanoplatelets and have an average diameter of from 20 nm to 500 nm, and an average thickness of from 2 to 40 nm.

3. The security or decorative element according to claim 1, wherein the organic material is a polymeric binder and is selected from the group consisting of poly(vinyl alcohol) (PVA), nitro cellulose, vinyl chloride, vinyl acetate copolymers, vinyl, acrylic, urethane, polythyleneterephthalate, terpene phenol, polyolefin, silicone, cellulose, polyamide, polyester and rosin ester resins.

4. The security or decorative element according to claim 1, wherein the organic material is an UV cured binder.

5. The security or decorative element according to claim 4, wherein UV cured binder comprises
(a) 0.02 to 20.0% by weight of photoinitiator,
(b) 99.0 to 1.0% by weight of a binder (unsaturated compound(s) including one or more olefinic double bonds).

6. The security or decorative element according to claim 5, wherein the UV cured binder comprises
(a) 0.05 to 10.0% by weight of photoinitiator,
(b) 97.0 to 3.0% by weight of a binder, and
(c) 0 to 96.9% by weight of solvent wherein the sum of components a) and b) and c) adds up to 100%.

7. The security or decorative element according to claim 1, wherein the second layer comprises inorganic nanoparticles.

8. The security or decorative element according to claim 1, wherein the transition metal is silver.

9. The security or decorative element according to claim 8, wherein the silver particles are in the form of nanoplatelets and have an average thickness of 8 to 25 nm and an average diameter of 15 to 40 nm, the security or decorative element shows a brown, or orange color in transmission.

10. The security or decorative element according to claim 8, wherein the silver particles are in the form of nanoplatelets and have an average thickness of 8 to 25 nm and an average diameter of 30 to 70 nm, the security or decorative element shows a red, or magenta color in transmission.

11. The security or decorative element according to claim 8, wherein the silver particles are in the form of nanoplatelets and have an average thickness of 8 to 25 nm and an average diameter of 50 to 150 nm, the security or decorative element shows a turquoise, or blue color in transmission.

12. The security or decorative element according to claim 1, comprising on at least part of the substrate surface the first layer, comprising the transition metal particles,
on part of the first layer the second layer in a defined shape selected from the group consisting of a symbol, a stripe, a geometrical shape, a design, lettering, an alphanumeric character, the representation of an object or parts thereof.

13. The security or decorative element according to claim 1, wherein the substrate comprises in or on its surface an optically variable image.

14. The security or decorative element according to claim 1, which comprises on at least part of the second layer a third layer which is partially transparent, or which comprises on at least part of the second layer a third layer in a defined shape selected from the group consisting of a symbol, a stripe, a geometrical shape, a design, lettering, an alphanumeric character, the representation of an object or parts thereof, which is transparent.

15. The security or decorative element according to claim 1, wherein the second layer has a refractive index from 1.3 to 1.7 and a thickness from 30 to 600 nm.

16. A method of producing the security or decorative element according to claim 1, comprising the steps of
a) providing the substrate having a surface, which surface may contain indicia or other visible features;
b) applying, on top of at least part of the said substrate surface the first layer, comprising transition metal particles having an average diameter of from 5 nm to 500 nm and the binder,
c) applying on at least part of the said first layer the second layer, comprising the organic material and having a refractive index of from 1.2 to 2.3, and a thickness of from 20 to 1000 nm, wherein the transition metal is selected from the group consisting of silver, copper, gold and palladium, wherein the weight ratio of transition metal particles to binder in the first layer is in the range from 20:1 to 1:2 in case the binder is a polymeric binder, or wherein the weight ratio of transition metal particles to binder in the first layer is in the range from 5:1 to 1:15 in case the binder is an UV curable binder.

17. A product, comprising the security or decorative element according to claim 1.

18. Use of the security or decorative element according to claim 1 for the prevention of counterfeit or reproduction, on a document of value, right, identity, a security label or a branded good.

* * * * *